United States Patent
Moussette et al.

(10) Patent No.: US 10,664,074 B2
(45) Date of Patent: May 26, 2020

(54) CONTACT-SENSITIVE CROWN FOR AN ELECTRONIC WATCH

(71) Applicant: Apple Inc., Cupertino, CA (US)

(72) Inventors: Camille Moussette, Los Gatos, CA (US); Duncan Kerr, San Francisco, CA (US); Colin M. Ely, Sunnyvale, CA (US); John B. Morrell, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/627,321

(22) Filed: Jun. 19, 2017

(65) Prior Publication Data

US 2018/0364815 A1    Dec. 20, 2018

(51) Int. Cl.
| | | |
|---|---|---|
| *G06F 3/0362* | (2013.01) | |
| *G04G 21/00* | (2010.01) | |
| *G04B 3/04* | (2006.01) | |
| *G06F 3/0485* | (2013.01) | |
| *G06F 3/0482* | (2013.01) | |

(Continued)

(52) U.S. Cl.
CPC ............ *G06F 3/0362* (2013.01); *G04B 3/04* (2013.01); *G04C 3/004* (2013.01); *G04G 17/04* (2013.01); *G04G 21/00* (2013.01); *G04G 21/08* (2013.01); *G06F 1/163* (2013.01); *G06F 3/0482* (2013.01); *G06F 3/0485* (2013.01); *G06F 3/04845* (2013.01); *G06F 2203/04806* (2013.01)

(58) Field of Classification Search
CPC .... G06F 3/0362; G06F 3/0485; G06F 3/0482; G04B 3/04; G04G 21/00
See application file for complete search history.

(56) References Cited

U.S. PATENT DOCUMENTS

| | | |
|---|---|---|
| 2,237,860 A | 4/1941 | Bolle |
| 2,288,215 A | 6/1942 | Taubert et al. |

(Continued)

FOREIGN PATENT DOCUMENTS

| | | |
|---|---|---|
| CH | 1888928 | 1/1937 |
| CN | 1302740 | 9/2001 |

(Continued)

OTHER PUBLICATIONS

Author Unknown, "Desirable Android Wear smartwatch from LG," Gulf News, Dubai, 3 pages, Jan. 30, 2015.

(Continued)

*Primary Examiner* — Kenneth Bukowski
(74) *Attorney, Agent, or Firm* — Brownstein Hyatt Farber Schreck, LLP

(57) ABSTRACT

A method of operating a wearable electronic device having a display and a rotatable crown includes initiating a rotation-tracking mode based on a detection of a contact between a user and the rotatable crown. In response to initiating the rotation-tracking mode, the electronic device controls a graphical output of the display in accordance with rotational movement or absence of rotational movement of the rotatable crown, terminates the rotation-tracking mode based on a termination of the contact between the user and the rotatable crown, and in response to terminating the rotation-tracking mode, controls the graphical output of the display without regard to rotational movement or absence of rotational movement of the rotatable crown.

14 Claims, 12 Drawing Sheets

(51) Int. Cl.
    *G06F 1/16*     (2006.01)
    *G06F 3/0484*     (2013.01)
    *G04G 17/04*     (2006.01)
    *G04C 3/00*     (2006.01)
    *G04G 21/08*     (2010.01)

(56) References Cited

U.S. PATENT DOCUMENTS

| | | |
|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 4,007,347 A | 2/1977 | Haber |
| 4,031,341 A | 6/1977 | Wuthrich et al. |
| 4,037,068 A | 7/1977 | Gaynor |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rifling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,134,189 A | 10/2000 | Carrard |
| 6,154,201 A | 11/2000 | Levin et al. |
| 6,175,679 B1 | 1/2001 | Veligdan et al. |
| 6,241,684 B1 | 6/2001 | Amano |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,016,263 B2 | 3/2006 | Gueissaz et al. |
| 7,021,442 B2 | 4/2006 | Borgerson |
| 7,034,237 B2 | 4/2006 | Ferri et al. |
| 7,081,905 B1 | 7/2006 | Raghunath et al. |
| 7,102,626 B2 | 9/2006 | Denny, III |
| 7,111,365 B1 | 9/2006 | Howie, Jr. |
| 7,113,450 B2 | 9/2006 | Plancon et al. |
| 7,119,289 B2 | 10/2006 | Lacroix |
| 7,135,673 B2 | 11/2006 | Saint Clair |
| 7,167,083 B2 | 1/2007 | Giles |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |

(56) References Cited

U.S. PATENT DOCUMENTS

| | | |
|---|---|---|
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,368,677 B2 | 2/2013 | Yamamoto |
| 8,371,745 B2 | 2/2013 | Manni |
| 8,373,661 B2 | 2/2013 | Lan et al. |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,783,944 B2 | 2/2014 | Doi |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,804,993 B2 | 8/2014 | Shukla et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,101,184 B2 | 8/2015 | Wilson |
| 9,105,413 B2 | 8/2015 | Hiranuma et al. |
| 9,123,483 B2 | 9/2015 | Ferri et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,350,850 B2 | 5/2016 | Pope et al. |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,552,023 B2 | 1/2017 | Joo et al. |
| 9,599,964 B2 | 3/2017 | Gracia |
| 9,607,505 B2 | 3/2017 | Rothkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,638,587 B2 | 5/2017 | Marquas et al. |
| 9,651,922 B2 | 5/2017 | Hysek et al. |
| 9,680,831 B2 | 6/2017 | Jooste et al. |
| 9,709,956 B1 | 7/2017 | Ely et al. |
| 9,753,436 B2 | 9/2017 | Ely et al. |
| D800,172 S | 10/2017 | Akana |
| 9,800,717 B2 | 10/2017 | Ma et al. |
| 9,836,025 B2 | 12/2017 | Ely et al. |
| 9,886,006 B2 | 2/2018 | Ely et al. |
| 9,891,651 B2 | 2/2018 | Jackson et al. |
| 9,898,032 B2 | 2/2018 | Hafez et al. |
| 9,939,923 B2 | 4/2018 | Sharma |
| 9,940,013 B2 | 4/2018 | Choi et al. |
| 9,946,297 B2 | 4/2018 | Nazzaro et al. |
| 9,971,305 B2 | 5/2018 | Ely et al. |
| 9,971,405 B2 | 5/2018 | Holenarsipur et al. |
| 9,977,499 B2 | 5/2018 | Westerman et al. |
| 9,979,426 B2 | 5/2018 | Na et al. |
| 10,092,203 B2 | 10/2018 | Mirov |
| 10,114,342 B2 | 10/2018 | Kim et al. |
| 10,209,148 B2 | 2/2019 | Lyon et al. |
| 10,331,082 B2 | 6/2019 | Ely et al. |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0211042 A1 | 9/2007 | Kim et al. |
| 2007/0222756 A1 | 9/2007 | Wu et al. |

(56) References Cited

U.S. PATENT DOCUMENTS

| | | |
|---|---|---|
| 2007/0229671 A1 | 10/2007 | Takeshita et al. |
| 2007/0247421 A1 | 10/2007 | Orsley et al. |
| 2008/0130914 A1 | 6/2008 | Cho |
| 2009/0051649 A1 | 2/2009 | Rondel |
| 2009/0073119 A1 | 3/2009 | Le et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Havrill |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1* | 7/2013 | Dent ............... G06Q 30/02 705/14.64 |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1* | 1/2014 | Gillespie ............ G06F 3/0312 345/163 |
| 2014/0071098 A1 | 3/2014 | You |
| 2014/0073486 A1 | 3/2014 | Ahmed et al. |
| 2014/0132516 A1 | 5/2014 | Tsai et al. |
| 2014/0197936 A1 | 7/2014 | Biggs et al. |
| 2014/0327630 A1 | 11/2014 | Burr et al. |
| 2014/0340318 A1 | 11/2014 | Stringer et al. |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0227217 A1 | 8/2015 | Fukumoto |
| 2015/0320346 A1 | 11/2015 | Chen |
| 2015/0338642 A1 | 11/2015 | Sanford |
| 2015/0366098 A1 | 12/2015 | Lapetina et al. |
| 2015/0370529 A1* | 12/2015 | Zambetti ............ G06F 1/1694 345/156 |
| 2016/0018846 A1 | 1/2016 | Zenoff |
| 2016/0054813 A1 | 2/2016 | Shediwy et al. |
| 2016/0058375 A1* | 3/2016 | Rothkopf ........... G06F 1/1643 600/301 |
| 2016/0061636 A1 | 3/2016 | Gowreesunker et al. |
| 2016/0062623 A1* | 3/2016 | Howard ............ G06F 3/04847 715/788 |
| 2016/0063850 A1* | 3/2016 | Yang ................ G08B 23/00 340/539.22 |
| 2016/0069713 A1 | 3/2016 | Ruh et al. |
| 2016/0098016 A1* | 4/2016 | Ely ................... G04G 21/00 368/308 |
| 2016/0103985 A1 | 4/2016 | Shim et al. |
| 2016/0109861 A1 | 4/2016 | Kim et al. |
| 2016/0116306 A1 | 4/2016 | Ferri et al. |
| 2016/0147432 A1* | 5/2016 | Shi .................. G06F 3/04855 715/753 |
| 2016/0168178 A1 | 6/2016 | Misra |
| 2016/0170598 A1* | 6/2016 | Zambetti ............ G06F 3/0485 715/784 |
| 2016/0170608 A1* | 6/2016 | Zambetti ........... G06F 3/04817 715/810 |
| 2016/0170624 A1* | 6/2016 | Zambetti ............ G06F 3/0362 715/771 |
| 2016/0241688 A1 | 8/2016 | Vossoughi |
| 2016/0253487 A1 | 9/2016 | Sarkar et al. |
| 2016/0258784 A1 | 9/2016 | Boonsom et al. |
| 2016/0259301 A1 | 9/2016 | Ely |
| 2016/0306437 A1 | 10/2016 | Zhang et al. |
| 2016/0306446 A1 | 10/2016 | Chung et al. |
| 2016/0313703 A1 | 10/2016 | Ely et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2016/0378071 A1 | 12/2016 | Rothkopf et al. |
| 2017/0003655 A1 | 1/2017 | Ely |
| 2017/0010751 A1 | 1/2017 | Shedletsky |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0045958 A1 | 2/2017 | Battlogg et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0024683 A1 | 1/2018 | Ely et al. |
| 2018/0136613 A1 | 5/2018 | Ely et al. |
| 2018/0136686 A1 | 5/2018 | Jackson et al. |
| 2018/0196517 A1 | 7/2018 | Tan et al. |
| 2018/0235491 A1 | 8/2018 | Bayley et al. |
| 2018/0239306 A1 | 8/2018 | Ely |
| 2018/0246469 A1 | 8/2018 | Ely et al. |
| 2018/0299834 A1 | 10/2018 | Ely et al. |
| 2018/0307363 A1 | 10/2018 | Ely et al. |
| 2018/0329368 A1 | 11/2018 | Ely et al. |
| 2018/0335891 A1 | 11/2018 | Shedletsky et al. |
| 2018/0341342 A1 | 11/2018 | Bushnell et al. |
| 2019/0017846 A1 | 1/2019 | Boonsom et al. |
| 2019/0163324 A1 | 5/2019 | Shedletsky |
| 2019/0250754 A1 | 8/2019 | Ely et al. |
| 2019/0294117 A1 | 9/2019 | Ely et al. |
| 2019/0302902 A1 | 10/2019 | Bushnell et al. |

FOREIGN PATENT DOCUMENTS

| | | |
|---|---|---|
| CN | 1445627 | 10/2003 |
| CN | 1504843 | 6/2004 |
| CN | 1624427 | 6/2005 |
| CN | 1792295 | 6/2006 |
| CN | 101035148 | 9/2007 |
| CN | 101201587 | 6/2008 |
| CN | 201081979 | 7/2008 |
| CN | 201262741 | 6/2009 |
| CN | 101750958 | 6/2010 |
| CN | 201638168 | 11/2010 |
| CN | 101923314 | 12/2010 |
| CN | 102216959 | 10/2011 |
| CN | 202008579 | 10/2011 |
| CN | 102890443 | 1/2013 |
| CN | 202710937 | 1/2013 |
| CN | 103191557 | 7/2013 |

(56) References Cited

FOREIGN PATENT DOCUMENTS

| | | |
|---|---|---|
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103956006 | 7/2014 |
| CN | 203693601 | 7/2014 |
| CN | 203732900 | 7/2014 |
| CN | 103995456 | 8/2014 |
| CN | 203941395 | 11/2014 |
| CN | 104777987 | 4/2015 |
| CN | 104685794 | 6/2015 |
| CN | 104880937 | 9/2015 |
| CN | 204650147 | 9/2015 |
| CN | 105096979 | 11/2015 |
| CN | 105547146 | 5/2016 |
| DE | 3706194 | 9/1988 |
| DE | 102008023651 | 11/2009 |
| DE | 102016215087 | 3/2017 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2720129 | 4/2014 |
| EP | 2884239 | 6/2015 |
| FR | 2030093 | 10/1970 |
| FR | 2801402 | 5/2001 |
| GB | 2433211 | 6/2007 |
| JP | S52151058 | 12/1977 |
| JP | S54087779 | 6/1979 |
| JP | S5708582 | 1/1982 |
| JP | S5734457 | 2/1982 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H10161811 | 6/1998 |
| JP | 11121210 | 4/1999 |
| JP | H11191508 | 7/1999 |
| JP | 2000337892 | 12/2000 |
| JP | 2001084934 | 3/2001 |
| JP | 2001167651 | 6/2001 |
| JP | 2001202178 | 7/2001 |
| JP | 2003050668 | 2/2003 |
| JP | 2003151410 | 5/2003 |
| JP | 2003331693 | 11/2003 |
| JP | 2004184396 | 7/2004 |
| JP | 2005017011 | 1/2005 |
| JP | 2005063200 | 3/2005 |
| JP | 2005108630 | 4/2005 |
| JP | 2006164275 | 6/2006 |
| JP | 2007149620 | 6/2007 |
| JP | 2007248176 | 9/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009070657 | 4/2009 |
| JP | 2010032545 | 2/2010 |
| JP | 2010165001 | 7/2010 |
| JP | 2010186572 | 8/2010 |
| JP | 2010243344 | 10/2010 |
| JP | 2010244797 | 10/2010 |
| JP | 2011165468 | 8/2011 |
| JP | 2013057516 | 3/2013 |
| JP | 2013079961 | 5/2013 |
| JP | 2014512556 | 5/2014 |
| JP | 2014174031 | 9/2014 |
| KR | 20010030477 | 4/2001 |
| KR | 20070011685 | 1/2007 |
| KR | 20070014247 | 2/2007 |
| KR | 100754674 | 9/2007 |
| KR | 20080045397 | 5/2008 |
| KR | 2020100007563 | 7/2010 |
| KR | 20110011393 | 2/2011 |
| KR | 20110012784 | 2/2011 |
| KR | 20110113368 | 10/2011 |
| KR | 20160017070 | 2/2016 |
| NL | 1040225 | 11/2014 |
| RO | 0129033 | 11/2013 |
| TW | 200633681 | 10/2006 |
| WO | WO2001/022038 | 3/2001 |
| WO | WO2001/069567 | 9/2001 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/147756 | 10/2015 |
| WO | WO2016/104922 | 6/2016 |
| WO | WO2016/155761 | 10/2016 |
| WO | WO2016196171 | 12/2016 |
| WO | WO2017/013278 | 1/2017 |

OTHER PUBLICATIONS

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "MyKronoz ZeTime: World's Most Funded Hybrid Smartwatch Raised over $3M on Kickstarter, Running until Apr. 27th," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, "Vyzin Electronics Private Limited launches Vesag Watch," http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

Author Unknown, "DeskThorityNet, Optical Switch Keyboards," http://deskthority.net/keyboards-f2/optical-switch-keyboards-t1474.html, 22 pages, Jul. 11, 2015.

Epstein et al., "Economical, High-Performance Optical Encoders," Hewlett-Packard Journal, pp. 99-106, Oct. 1988. [text only version].

GreyB, "Google Watch: Convert your arm into a keyboard," http://www.whatafuture.com/2014/02/28/google-smartwatch/#sthash.Yk35cDXK.dpbs, 3 pages, Feb. 28, 2014.

IBM, "Additional Functionality Added to Cell Phone via "Learning" Function Button," www.ip.com, 2 pages, Feb. 21, 2007.

(56) References Cited

OTHER PUBLICATIONS

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.
Krishnan et al., "A Miniature Surface Mount Reflective Optical Shaft Encoder," Hewlett-Packard Journal, Article 8, pp. 1-6, Dec. 1996.
Rick, "How VESAG Helps Health Conscious Citizens," http://sensetekgroup.com/2010/11/29/wireless-health-monitoring-system/, 2 pages, Nov. 29, 2010.
Sadhu, Rajendra, "How VESAG Helps People Who Want to 'Be There'?," http://ezinearticles.com/?How-Vesag-Helps-People-Who-Want-to-Be-There?&id-5423873, 1 page, Nov. 22, 2010.
Sadhu, Rajendra, "Mobile Innovation Helps Dementia and Alzheimer's Patients,"http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.
U.S. Appl. No. 16/179,870, filed Nov. 2, 2018, pending.
U.S. Appl. No. 16/179,872, filed Nov. 2, 2018, pending.
U.S. Appl. No. 16/191,349, filed Nov. 14, 2018, pending.
U.S. Appl. No. 15/134,888, filed Sep. 18, 2018, pending.
U.S. Appl. No. 15/960,487, filed Apr. 23, 2018, pending.
U.S. Appl. No. 15/969,630, filed May 2, 2018, pending.
U.S. Appl. No. 16/010,502 filed Jun. 17, 2018, pending.
International Search Report and Written Opinion, PCT/US2018/034946, 14 pages, dated Aug. 24, 2018.

\* cited by examiner

CONTACT-SENSITIVE CROWN FOR AN ELECTRONIC WATCH

FIELD

The described embodiments relate generally to electronic devices and, more particularly, to a crown for a wearable electronic device.

BACKGROUND

Electronic devices frequently use physical input devices to facilitate user interaction. For example, buttons, keys, dials, and the like, can be physically manipulated by users to control operations of the device. Physical input devices may use various types of sensing mechanisms to translate the physical manipulation to signals usable by the electronic device. For example, buttons and keys may use collapsible dome switches to detect presses, while dials and other rotating input devices may use encoders or resolvers to detect rotational movements.

SUMMARY

A wearable electronic device includes a housing, a band attached to the housing and configured to attach the wearable electronic device to a user, a display positioned within the housing and defining a front face of the wearable electronic device, and a crown positioned along a side of the housing. The wearable electronic device may also include a rotation sensor configured to detect a rotational movement of the crown, a contact sensor configured to detect a contact between the user and the crown, and a processor operatively coupled to the contact sensor and the display. The processor may be configured to, while a contact is detected between the user and the crown, control a graphical output of the display in accordance with rotational movement of the crown, and, after detecting a release of the contact between the user and the crown, control the graphical output of the display without regard to rotational movement or absence of rotational movement of the crown.

Controlling the graphical output of the display in accordance with rotational movement of the crown may include causing a list of items to scroll across the display in a scroll direction in accordance with a direction of rotation of the crown, and controlling the graphical output of the display without regard to rotational movement or absence of rotational movement of the crown may include continuing to scroll the list of items across the display while detecting no rotation of the crown.

Controlling the graphical output of the display in accordance with rotational movement of the crown may include causing a portion of a list of items to scroll off of the display in a first direction, and controlling the graphical output of the display without regard to rotational movement or absence of rotational movement of the crown may include causing the portion of the list of items to scroll onto the display in a second direction opposite the first direction.

The crown may include a knob having a conductive portion and a stem conductively coupled to the conductive portion of the knob and extending into the housing. The contact sensor may include a capacitive sensor conductively coupled to the stem. The stem may be electrically isolated from the housing. The knob and the stem may be a monolithic structure. The capacitive sensor may be conductively coupled to the stem via a rotary electrical contact.

A method of operating a wearable electronic device having a display and a rotatable crown includes modifying a graphical output of the display in accordance with a rotational movement of the rotatable crown, terminating a rotation-tracking mode based on a termination of a contact between a user and the rotatable crown, and in response to terminating the rotation-tracking mode, modifying the graphical output of the display despite absence of the rotational movement of the rotatable crown.

Modifying the graphical output of the display in accordance with the rotational movement of the rotatable crown may include moving an element displayed on the display in a first direction based at least partially on the rotational movement of the rotatable crown, and modifying the graphical output of the display despite absence of the rotational movement of the rotatable crown may include moving the element in a second direction opposite the first direction.

Modifying the graphical output of the display in accordance with the rotational movement of the rotatable crown may include moving an element displayed on the display in a first direction and at a speed based at least partially on the rotational movement of the rotatable crown, and modifying the graphical output of the display despite absence of the rotational movement of the rotatable crown may include moving the element in the first direction despite detecting no rotational movement of the rotatable crown. Moving the graphical output of the display despite absence of the rotational movement of the rotatable crown may further include moving the graphical output of the display at a speed that decreases over time. The method may further include, after moving the graphical output of the display in the first direction despite detecting no rotational movement of the rotatable crown, detecting a subsequent contact between the user and the rotatable crown, and in response to detecting the subsequent contact between the user and the rotatable crown, ceasing to move the graphical output of the display.

A method of operating a wearable electronic device having a display and a rotatable crown includes initiating a rotation-tracking mode based on a detection of a contact between a user and the rotatable crown, in response to initiating the rotation-tracking mode, controlling a graphical output of the display in accordance with rotational movement or absence of rotational movement of the rotatable crown, terminating the rotation-tracking mode based on a termination of the contact between the user and the rotatable crown, and in response to terminating the rotation-tracking mode, controlling the graphical output of the display without regard to rotational movement or absence of rotational movement of the rotatable crown. Detecting the contact between the user and the rotatable crown may include detecting an electrical characteristic of the rotatable crown that is indicative of contact between a user and the rotatable crown.

Controlling the graphical output of the display in accordance with rotational movement or absence of rotational movement of the rotatable crown may correspond to or be referred to as controlling the graphical output of the display in accordance with a first user-interface control scheme, and controlling the graphical output of the display without regard to rotational movement or absence of rotational movement of the rotatable crown may correspond to or be referred to as controlling the graphical output of the display in accordance with a second user-interface control scheme.

Controlling the graphical output of the display in accordance with the first user-interface control scheme may include causing a list of items to scroll across the display in a scroll direction based on a rotation direction of the rotatable crown. The scroll direction may be a first scroll direction, and controlling the graphical output of the display in accordance with the second user-interface control scheme may include causing the list of items to scroll across the display in a second scroll direction opposite the first scroll direction.

Controlling the graphical output of the display in accordance with the second user-interface control scheme may include causing the list of items to scroll across the display in the scroll direction. Controlling the graphical output of the display in accordance with the second user-interface control scheme may include causing the list of items to scroll across the display at a decreasing speed.

The method may further include, while the list of items is scrolling across the display, initiating a subsequent rotation-tracking mode based on a detection of a subsequent contact between the user and the rotatable crown, during the subsequent rotation-tracking mode, determining if a speed of rotation of the rotatable crown is below a threshold value, and in accordance with a determination that the speed of rotation of the rotatable crown is below the threshold value, causing the list of items to cease scrolling across the display.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
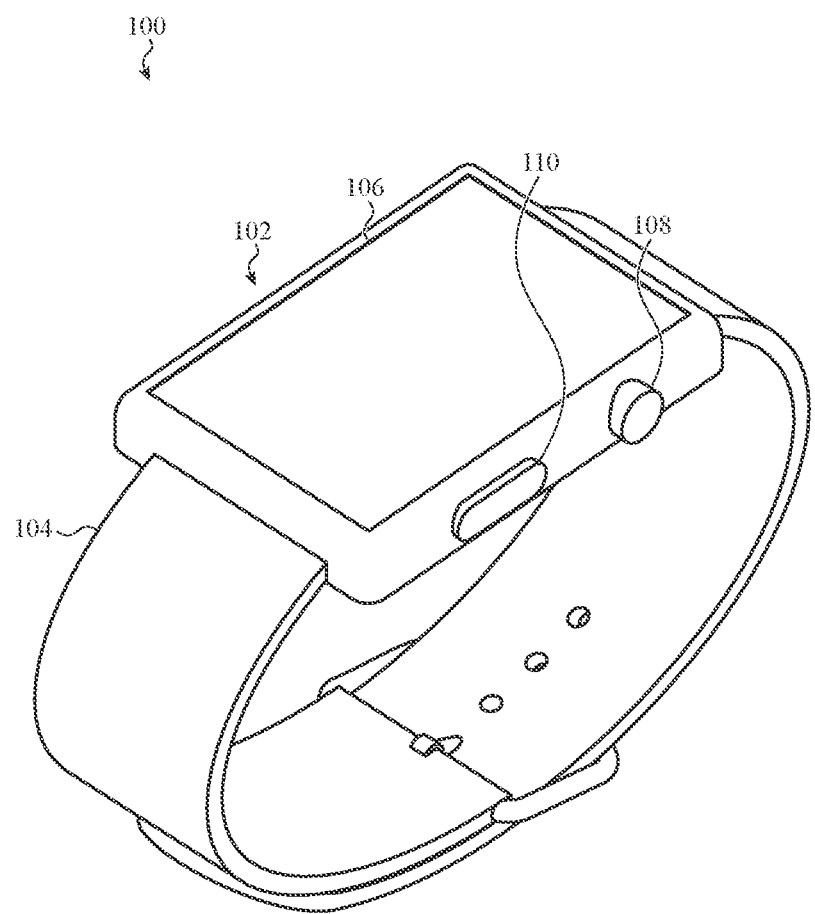
FIGS. 1-2 depict an electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a crown of a wearable electronic device, such as a smart watch, and more particularly to a crown that includes contact-sensing functionality. For example, a crown of a wearable electronic device, such as a smart watch, may detect rotational movements (e.g., turning the crown), as well as translational movements (e.g., pushing or pulling the crown). These movements may be used to control various aspects of the electronic device, including manipulating a graphical output of a display. For example, a rotational movement of the crown may scroll a list that is shown on the display, or change the focus of a cursor or other indicator shown on the display. A translational movement of the crown, such as a push, may select displayed objects or activate certain device functions.

By adding contact-sensing functionality to a crown, the electronic device can determine to a greater degree of certainty whether any given rotational or translational motion is an intentional input or an accidental input. For example, a contact sensor may be configured to detect contact with the skin of a user, such as a user's fingertip. Because contact with objects or materials other than a user's skin are less likely to be intentional inputs, detecting contact between the crown and a user's skin may trigger or initiate a window for responding to rotational or translational movements of the crown. Within the window, the device may respond to rotational and/or translational movements (or lack thereof) of the crown because they are likely caused by direct interaction from a user. Outside the window (e.g., when no contact is detected), rotational and/or translational movements may be ignored as they are likely caused by accidental contact with the crown, such as by brushing the crown against a shirt sleeve or pocket.

By using a rotation tracking window as described herein, graphical outputs may be initiated and controlled with greater responsiveness and less lag and delay. For example, without contact-sensing functionality on the crown, an electronic device may ignore small movements of the crown so that accidental rotations or natural finger motion (which occur even when a user is attempting to keep the crown still) do not cause distracting or undesirable graphical outputs, scrolling, or user-interface activity. However, these techniques may result in a slower response to rotational inputs because a rotational input may be ignored until a certain threshold amount of rotation is satisfied. Thus there may be a period where a user is rotating the crown but the graphical output is not changing as expected. By using a contact sensor to establish a rotation tracking window, the electronic device may react more quickly to rotational inputs because any rotation detected within the window is more likely to be intentional. For example, scrolling of displayed items may appear to begin immediately upon rotation of the crown, rather than after a "dead band" or other rotational threshold is exceeded.

Further, the added contact-sensing functionality facilitates more intuitive and useful user interactions and user-interface functions. For example, a scroll animation that is initiated by a user rotating the crown can continue after the user's finger is removed from the crown, and then terminate when the user's finger is placed on the crown once again. Thus, the user can initiate a fast or continuing scroll by "flicking" the crown, and end the continuing scroll by touching the crown again. As another example, a display of the electronic device can be activated when a user places a finger on the crown, and deactivated when the user removes the finger, even if the user never rotates or translates (e.g., presses) the crown.

Figure 2:
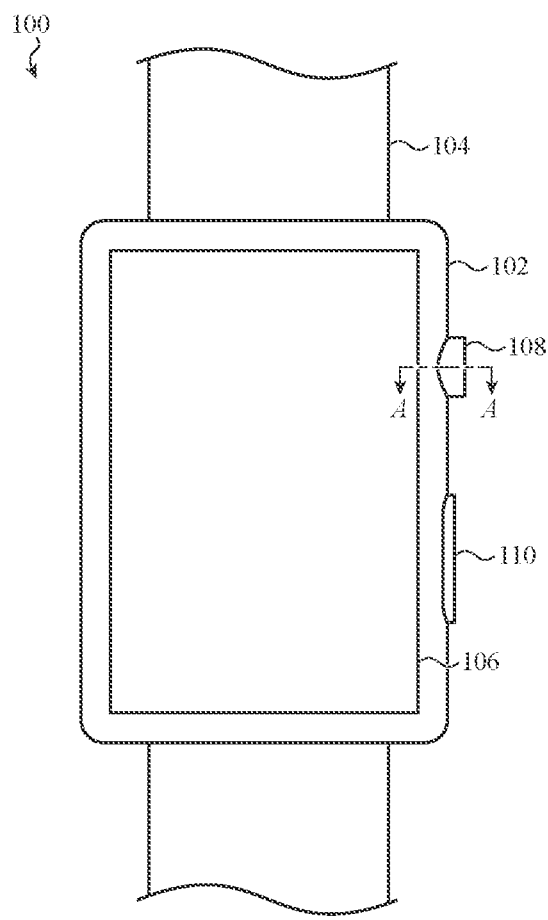

FIGS. 1 and 2 depict an electronic device 100. The electronic device 100 is depicted as a watch, though this is merely one example, and the concepts discussed herein may apply equally or by analogy to other electronic devices, including mobile phones (e.g., smartphones), tablet computers, notebook computers, head-mounted displays, digital media players (e.g., mp3 players), or the like.

The electronic device 100 includes a housing 102 and a band 104 coupled to the housing. The band 104 may be configured to attach the electronic device 100 to a user, such as to the user's arm or wrist.

The electronic device 100 also includes a display 106 coupled to the housing 102. The display 106 may define a front face of the electronic device 100. For example, in some cases, the display 106 defines substantially the entire front face and/or surface of the electronic device. The display 106 may be a touch- and/or force-sensitive display, and may include or be associated with any suitable touch or force sensing components, including capacitive sensors, resistive sensors, surface acoustic wave sensors, piezoelectric sensors, strain gauges, or the like. In conjunction with touch sensors, the display 106 may be configured to detect locations of touch events applied to the display 106, including locations of multiple simultaneous touches. In conjunction with force sensors, the display 106 may be configured to detect amounts or magnitudes of force associated with touch events applied to the display 106. The touch- and/or force-sensitive display may receive various types of user inputs to control or modify the operation of the device, including taps, swipes, multi-finger inputs, single- or multi-finger touch gestures, presses, and the like.

The electronic device 100 may also include other inputs, switches, buttons, or the like. For example, the electronic device 100 includes a button 110. The button 110 may be a movable button (as depicted) or a touch-sensitive region of the housing 102. The button 110 may control various aspects of the electronic device 100. For example, the button 110 may be used to select icons, items, or other objects displayed on the display 106, to activate or deactivate functions (e.g., to silence an alarm or alert), or the like.

The electronic device 100 also includes a crown 108 coupled to the housing 102. The crown 108 may afford a variety of potential user interactions. For example, the crown 108 may be rotatable about a rotation axis and relative to the housing 102 to accept rotational inputs. The crown 108 may also be translatable relative to the housing 102 to accept translational inputs. For example, the crown 108 may be movable along the rotation axis, towards and/or away from the housing 102. In particular, the crown 108 may be manipulated by pushing and/or pulling on the crown 108. As described herein, rotational and translational inputs may control various operations and user interfaces of the electronic device 100. In particular, inputs to the crown 108 may modify the graphical output of the display 106. For example, rotational movement of the crown 108 may zoom, scroll, or rotate a user interface or other object displayed on the display 106 (among other possible functions), while translational movements may select highlighted objects or icons, or activate or deactivate functions (among other possible functions).

The crown 108 may also be associated with or include a contact sensor that is configured to detect contact between a user and the crown 108 (e.g., touch inputs or touch events applied to the crown 108). The contact sensor may include or use any suitable type of sensor(s), including capacitive sensors, resistive sensors, magnetic sensors, inductive sensors, or the like. In some cases, the crown itself, or components of the crown, may be conductive and may define a conductive path between the user (e.g., the user's finger) and a contact sensor. For example, the crown may be formed from or include metal, and may be an electrode for conductively coupling a capacitive sensor to the user.

Figure 3A:
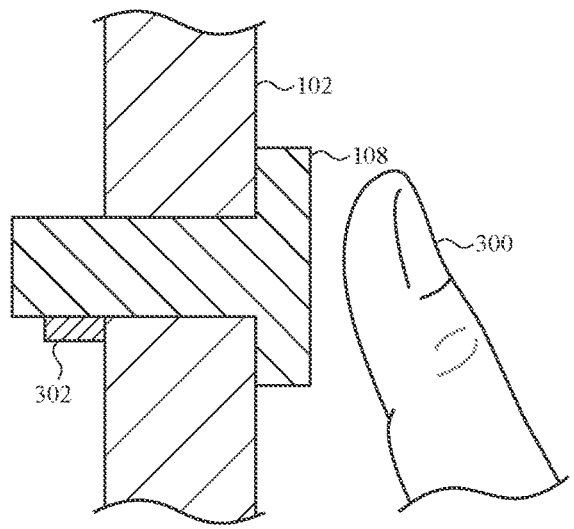
FIGS. 3A-5 depict partial cross-sectional views of the electronic device of FIGS. 1-2 viewed along line A-A in FIG. 2.
Figure 3B:
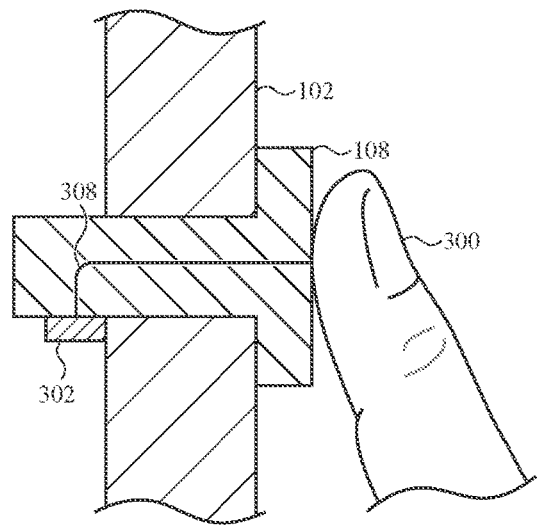
Figure 3C:
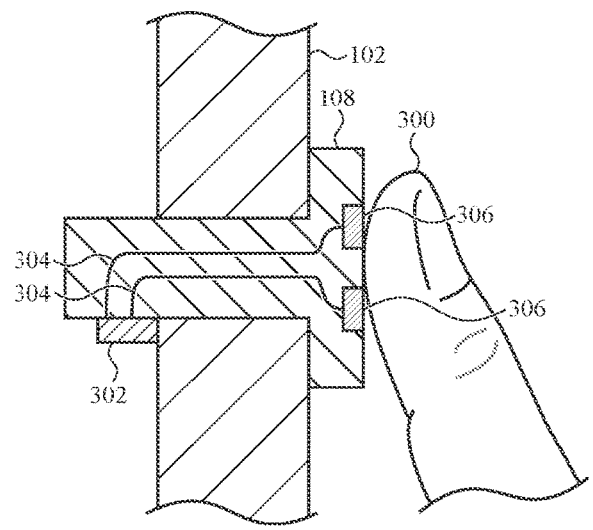

FIGS. 3A-3C are partial cross-sectional views of the electronic device 100, viewed along line A-A in FIG. 2. The cross-sectional views in FIGS. 3A-3C do not necessarily correspond to the exact structure of the electronic device 100 or any components thereof, and are instead intended as schematic views showing particular features of the crown 108 and in particular how the crown 108 may work with a contact sensor 302 to enable contact sensing via the crown 108.

As shown in FIG. 3A, the electronic device 100 includes a contact sensor 302 configured to detect a contact between the user and the crown. Information from the contact sensor 302 may be used to initiate a rotation tracking window, as described herein. This allows the electronic device 100 to act on rotational inputs immediately upon detecting rotation. For example, a graphical output can be controlled or changed as soon as rotation is detected along with contemporaneously detected contact between a user and the crown. This may reduce or eliminate the need for (or the effects of) dead bands, delays, or other filters that may be used where the crown 108 is not contact-sensitive.

As noted above, the contact sensor 302 may be any suitable type of contact sensor, and/or may rely on any suitable contact sensing technology. As shown, the contact sensor 302 is a capacitive contact sensor that detects touch events by detecting capacitive coupling between the crown 108 (or an electrode associated with the crown 108) and external objects.

The contact sensor 302 may be conductively coupled to the crown 108. As shown, the contact sensor 302 is in direct contact with the crown 108, though the contact sensor 302 may be conductively coupled to the crown via any suitable component or mechanism, including a rotary electrical contact such as a slip ring, brush (e.g., graphite brush), biased leaf spring, or the like. The crown 108 may be formed from or include conductive material to define a conductive path from an external surface of the crown 108 to the contact sensor 302. For example, the crown 108 may be formed from one or more pieces of metal (e.g., aluminum, stainless steel), graphite, carbon fiber, conductive ceramics, or the like. The crown may include non-conductive portions as well, including coatings, paints, caps, covers, or the like, so long as a conductive path exists between the contact sensor 302 and at least part of an exterior surface that is likely to be touched by a user when the user is manipulating the crown 108.

As shown in FIG. 3B, when a user's finger 300 (or other skin or body part) contacts the crown 108, a conductive path 304 is formed between the contact sensor 302 and the user's finger 300, thus capacitively coupling the user's finger 300 to the contact sensor 302. Where other types of contact sensors are used, such as inductive or resistive contact sensors, the capacitive coupling may be irrelevant or otherwise not used to sense touch events or contact with the user.

FIG. 3C shows another example of the crown 108 that includes electrodes 306 incorporated into the crown 108. The electrodes 306 may be conductively coupled to the contact sensor 302 via conductors 308 (or other conductive paths). The conductors 308 may be electrically isolated from the material of the crown 108 and from one another to provide isolated electrical paths from the electrodes 306 to the contact sensor 302. The contact sensor 302 may be configured to detect continuity between the electrodes, which may occur when a finger 300 contacts two or more electrodes 306. The contact sensor 302 may also or instead use multiple electrodes 306 to implement a mutual capacitance sensing scheme.

While FIG. 3C shows an example with two electrodes 306, more or fewer electrodes may be used. For example, in some cases, only a single electrode 306 is used. In such cases, the single electrode 306 may be the only component on the crown 108 that is conductively coupled to a contact sensor. In other cases, both the single electrode 306 and the crown itself 108 may be conductively coupled to the contact sensor. For example, a crown formed of conductive material may include a single electrode 306 and single conductor 308 that are electrically isolated from the material of the crown. The contact sensor 302 may be conductively coupled to the single conductor and the material of the crown. Accordingly, contact sensing schemes using two conductive paths (e.g., continuity, mutual capacitance) may be implemented using a conductive crown with only a single electrode 306.

Figure 4:
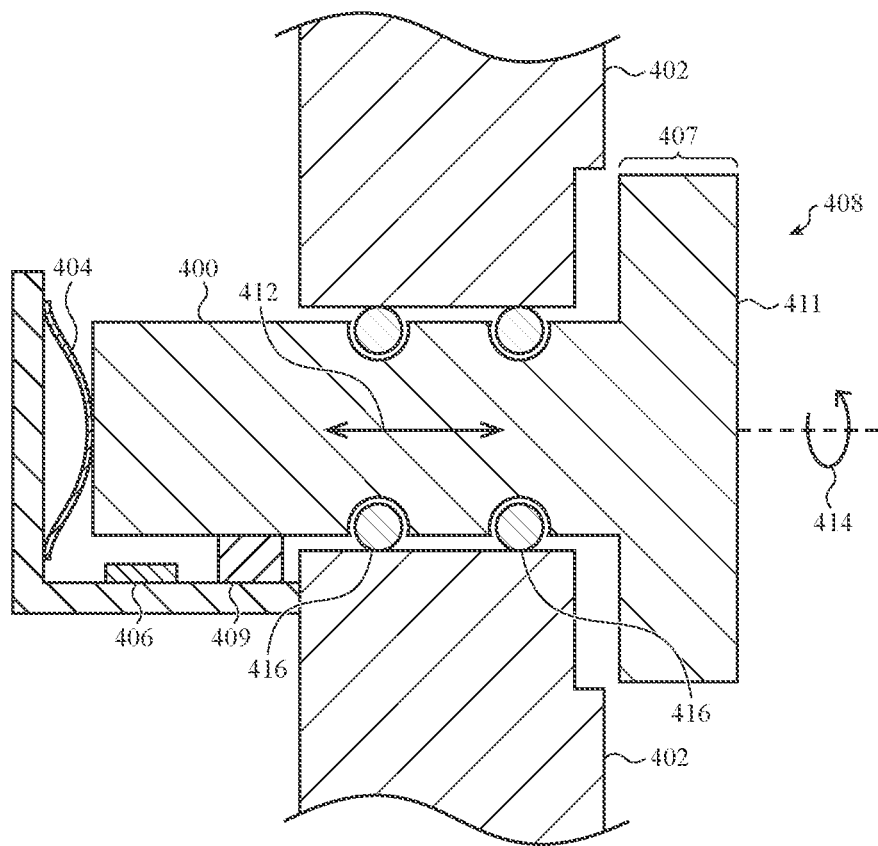

FIG. 4 shows a partial cross-sectional view of an embodiment of an electronic device, such as the electronic device 100 (FIG. 1). The cross-sectional view in FIG. 4 corresponds to a view of an electronic device along line A-A in FIG. 2. FIG. 4 shows details of a crown 408 (which may correspond to the crown 108) and how the crown 408 may be structurally integrated with a housing 402 (which may correspond to the housing 102) as well as rotation, translation, and contact sensors. As described herein, integrating a contact sensor with a rotatable crown as shown in FIG. 4 allows the device to more definitively determine whether or not a rotational movement is intentional, which can produce faster and more precise responses to rotational inputs.

The crown 408 may include a knob 407 and a stem 400, with the stem 400 extending into the housing 402. The knob 407 and stem 400 may be a monolithic structure, including a single structure formed by machining, casting, molding, or otherwise forming a single piece of material into a crown 408 defining the knob 407 and stem 400. In other cases, the knob 407 and the stem 400 may be formed separately and attached to each other via adhesive, welding, mechanical fasteners, or the like. The crown 408 may also include other materials, components, coatings, or the like, which may or may not be conductive. For example, the stem 400 may be coated with an insulating material, a low-friction coating (e.g., polytetrafluoroethylene), or the like. Or a cap or disk may be placed on an exterior face 411 of the crown 408 (or positioned in an opening or recess in the exterior face 411). If any such components or materials are nonconductive, they may be integrated with the crown 408 so that a conductive path is formed between a contact sensor 409 and an interface surface or portion of the crown 408 (e.g., the portion that is usually or most likely contacted by a user when the user is manipulating the crown 408 to provide inputs to the device).

The crown 408 may be coupled to the housing 402 such that the crown 408 can translate and rotate relative to the housing 402. Rotational movements may be about a rotation axis, as indicated by arrow 414, while translational movements may be along the rotation axis, as indicated by arrow 412. To facilitate these movements, the electronic device may include one or more interface components 416 between the crown 408 (e.g., the stem 400) and the housing 402. The interface components 416 may be any suitable material or component, including an O-ring formed from or including rubber, elastomer, silicone, or any other suitable material. The interface components 416 may slide, deform, or translate relative to the housing 402 and the crown 408, thus allowing the crown 408 to move relative to the housing 402. The interface components 416 may also maintain a seal between the stem 400 and the housing 402 during rotation and translation of the crown 408.

The electronic device includes sensors for detecting rotational and/or translational movement of the crown 408. For example, a rotation sensor 406 may detect rotational movement of the crown 408, while a switch 404 may detect translational movement. The switch 404 may be a collapsible dome or any other suitable switch that can detect translational movement. Where the switch 404 is a collapsible dome, the dome may provide a tactile response to the crown 408 as well as a biasing or return force that forces the crown 408 towards an unactuated (e.g., rest) state.

The rotation sensor 406 may be any suitable type of rotation sensor, including an optical sensor, an encoder, a hall-effect sensor, a resolver, or any other suitable sensor that can detect rotational movements of the crown 408. In some cases, the stem 400 (or another portion or component of the crown 408) may include features to assist in rotation tracking. For example, the stem 400 may have grooves, teeth, or optical features (e.g., a printed pattern) that an optical sensor can detect. In some cases, the rotation sensor 406 detects defects in the surface finish of the stem 400, including scratches, indentations, or other irregular features that do not adhere to a regular or periodic pattern.

The rotation sensor 406 may provide various information about rotational movements of the crown 408, including speed of rotation, direction of rotation, acceleration of rotation, and the like. Such information may be used to control the operation of an electronic device in various ways. For example, a graphical output of a display (e.g., the display 106) may be responsive to rotational inputs from the crown. As one example, a rotational input may cause a list of items that is being displayed on a display (e.g., the display 106) to scroll across the display at a speed and/or direction dictated by a speed and/or direction of rotation of the crown 408. As another example, a zoom level of a graphical user interface, image, or other displayed object may be controlled by rotating the crown 408. The zoom or magnification level may change based on the speed and/or direction of rotation of the crown. Rotational inputs may be used to control other aspects of a device in addition to or instead of those examples provided. Further, as noted herein, rotational inputs detected by the rotation sensor 406 may control the graphical output of the device only when a contemporaneous touch event is detected on the crown 408 via the contact sensor 409.

The contact sensor 409 may be any suitable contact sensor. In some cases, the contact sensor 409 is a capacitive sensor that is conductively coupled to the crown 408. Other types of contact sensors may also be used, including resistive sensors, magnetic sensors, inductive sensors, or the like. The crown 408 may be conductively coupled to the contact sensor 409 via a conductor. Because the crown 408 is rotatable, the contact sensor 409 may be conductively coupled to the crown 408 (e.g., the stem 400 of the crown 408) via an electrical connector that allows the crown 408 to rotate. For example, a slip ring, brush (e.g., a graphite brush), biased leaf spring, or any other suitable rotary electrical contact or connection technique, may conductively couple the contact sensor 409 to the stem 400. As shown in FIG. 4, the contact sensor 409 is adjacent the stem 400, though this is merely for illustration. In other cases, the crown 408 may be conductively coupled to a contact sensor 409 that is located elsewhere within the housing 402.

As noted above, some types of sensors, such as capacitive sensors, rely on a conductive path between the sensor and a sensed object in order to detect touch events. In order to isolate contact-sensitivity to the crown 408, the crown 408 may need to be electrically isolated from other conductive components of the electronic device (e.g., the housing 402). Accordingly, in some cases, the interface components 416 may electrically isolate the crown 408 from the housing 402.

For example, the interface components 416 may be formed from dielectric or nonconductive material (e.g., rubber, silicone, ceramic, plastic), thus preventing a conductive path between the crown 408 and the housing 402 under normal use conditions, and isolating the contact sensing functionality to the crown 408 itself. If the crown 408 was not electrically isolated from the housing 402, the contact sensor 409 may be unable to distinguish between touch events on the housing 402 and touch events on the crown 408, which may reduce the effectiveness of such inputs.

Figure 5:
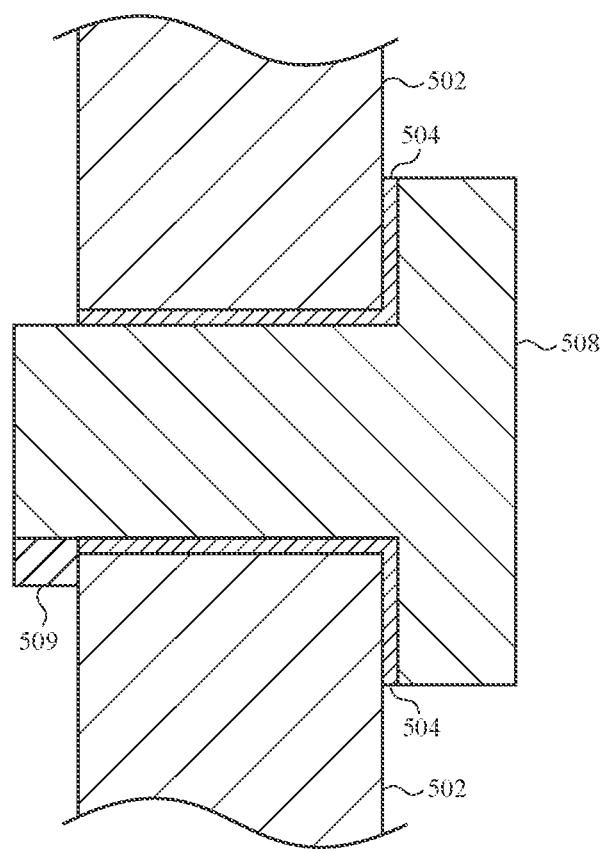

FIG. 5 shows a partial cross-sectional view of an embodiment of an electronic device, such as the electronic device 100 (FIG. 1). The cross-sectional view in FIG. 5 corresponds to a view of an electronic device along line A-A in FIG. 2. FIG. 5 shows details of a non-movable crown 508 (which may correspond to the crown 108) and how the crown 508 may be structurally integrated with a housing 502 (which may correspond to the housing 102) and a contact sensor 509. As noted, the crown 508 is fixed in position relative to the housing 502, and thus does not rotate or translate relative to the housing 502. Rather, user inputs such as presses and swipes (e.g., a user sliding a finger over the peripheral rim of the crown 508) may be detected by force sensors, optical sensors, or any other suitable type of sensor.

The contact sensor 509 may be a capacitive sensor (or any other suitable sensor), and may be conductively coupled to the crown 508 in any suitable way, as described above with respect to the crown 408. Despite being fixed to the housing 502, the crown 508 may be electrically isolated from the housing 502 to isolate the contact sensing functionality to the crown 508. For example, a dielectric or nonconductive material 504 may be disposed between the crown 508 and the housing 502. The material 504 may be any suitable material, including plastic, rubber, silicone, adhesive, epoxy, ceramic, or the like.

Figure 6:
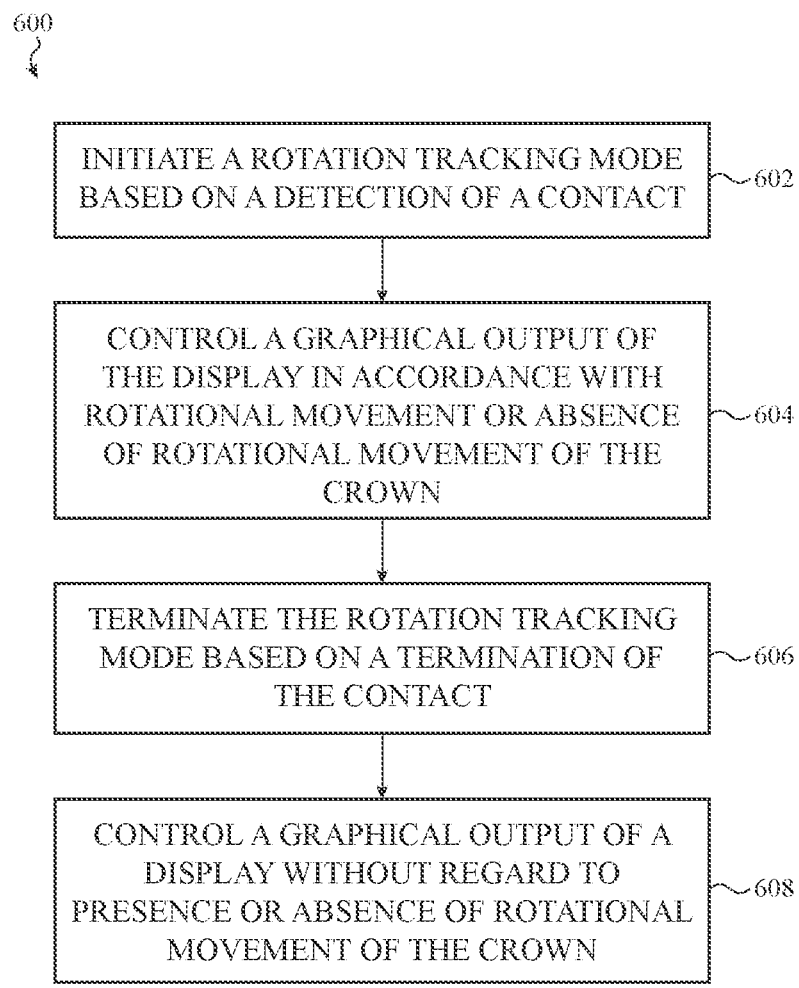
FIG. 6 depicts an example process for operating a graphical output of an electronic device using a contact-sensitive rotatable crown.

FIG. 6 depicts an example process 600 for operating a wearable electronic device, such as the electronic device 100 (FIGS. 1 and 2), or any other suitable wearable electronic device. The wearable electronic device may have a display (e.g., the display 106) and a crown configured to receive rotational or dial-based input (e.g., the crown 108), as described above. The process 600 may be implemented as processor-executable instructions that are stored within memory of the wearable electronic device. The process 600 leverages the contact-sensitivity of the crown to determine when to respond to rotational movement of the crown (e.g., when to modify a graphical output of the display based on the rotational movement), and when to ignore rotational movement. The process 600 may also use the contact-sensitivity of the crown to trigger discrete user-interactions, such as activating and deactivating a display.

In operation 602, a rotation-tracking mode is initiated based on a detection of a contact between a user and the rotatable crown. Detecting the contact between the user and the rotatable crown may include detecting an electrical characteristic of the rotatable crown that is indicative of contact between a user and the rotatable crown. The electrical characteristic may be, for example, a capacitance, a resistance, or the like, and may be measured by a contact sensor within the electronic device (e.g., a capacitive sensor that is conductively coupled to the crown).

Detecting contact between a user and the rotatable crown (e.g., via a capacitive sensor) indicates that a user likely has a finger or hand on the rotatable crown, and thus that any motion of the crown (such as rotational or translational motions) are likely intentional inputs to the crown. Accordingly, at operation 604, in response to initiating the rotation-tracking mode, the electronic device may control a graphical output of the display in accordance with rotational movement or absence of rotational movement of the rotatable crown as detected by a rotation sensor (e.g., the rotation sensor 406) associated with the crown. Controlling the graphical output of the display in accordance with rotational movement or absence of rotational movement of the rotatable crown may be referred to as controlling the graphical output of the display in accordance with a first user-interface control scheme. Controlling the graphical output may include moving (e.g., scrolling) an element or item displayed on the display, or zooming in or out on an image, user interface, or other content displayed on the display. Yet another example of controlling the graphical output may include changing a color or other visible property (e.g., shape, size, saturation, contrast) of a displayed element or item. Other ways of controlling and/or modifying a graphical output are also contemplated.

By waiting until a rotation-tracking mode is initiated before controlling the graphical output of the display in accordance with rotational movement of the rotatable crown, may facilitate more responsive graphical outputs. For example, as noted above, the detection of a contact between the user and the crown indicates that the user is intentionally touching the crown. As a result, the electronic device may react immediately or more quickly to signals from a rotation sensor, because any rotation that is contemporaneous with a touch input is likely an intentional rotation. In some cases, using a contact-triggered rotation tracking mode may reduce or eliminate the need for heuristics to guess whether a detected rotation is likely intentional. Such heuristics may include timers, delays, or filters, all of which may introduce delay and lag between rotation of crown and modification of the graphical output.

One particular example of controlling the graphical output of the display in accordance with rotational movement of the rotatable crown (e.g., according to the first user-interface control scheme) may include causing a list of items to scroll across the display in accordance with a direction of rotation of the rotatable crown. For example, if a list of items such as words (e.g., names, contacts), images (e.g., thumbnails, photographs), icons, or the like, is displayed on the display, the rotational movement of the crown may cause the list of items to scroll. Controlling the graphical output of the display in accordance with rotational movement of the rotatable crown may also or instead include causing the list of items to scroll across the display in accordance with a speed of rotation of the rotatable crown. Controlling the graphical output of the display in accordance with rotational movement or absence of rotational movement of the rotatable crown (e.g., according to the first user-interface control scheme) may include causing the list of items to remain stationary when no rotation is detected. Examples of scrolling (or not scrolling) a list of items during a rotation-tracking mode are described herein with reference to FIGS. 7A-8D.

At operation 606, the rotation-tracking mode is terminated based on a termination of the contact between the user and the rotatable crown (e.g., when the user lifts his or her finger off of the crown). For example, a contact sensor may detect a change or end of the electrical characteristic (e.g., a capacitance, resistance, etc.) that is indicative of contact between the user and the rotatable crown. Terminating the rotation-tracking mode may correspond to the electronic device simply ignoring further signals, or lack thereof, from the rotation sensor (e.g., encoder). In some cases, the rotation sensor may be deactivated, turned off, or placed in a low-power mode when the rotation-tracking mode is not active (e.g., after the rotation-tracking mode is terminated). In other cases, the rotation sensor may remain in a normal operating mode, and any signals or other data or signals indicative of rotation or lack of rotation of the crown may be ignored (e.g., they might not be used to control a graphical output of the device).

At operation 608, in response to terminating the rotation-tracking mode, the graphical output of the display is controlled without regard to rotational movement or absence of rotational movement of the rotatable crown. Controlling the graphical output of the display without regard to rotational movement or absence of rotational movement of the rotatable crown may be referred to as controlling the graphical output of the display in accordance with a second user-interface control scheme.

In some cases, controlling the graphical output without regard to rotational movement or absence of rotational movement (e.g., according to the second user-interface control scheme) includes causing the graphical output to move or provide a simulation or appearance of motion even if there is no rotational motion detected by a rotation sensor. In other cases, controlling the graphical output without regard to rotational movement or absence of rotational movement includes causing the graphical output to not move (e.g., maintaining a stationary display) even if rotational motion is detected by the rotation sensor. Thus, in some implementations, detecting contact between a user and the rotatable crown may be a logical or programmatic condition precedent to modifying a graphical output based on a state of the rotation sensor, such as speed and/or direction of motion, if any. Examples of controlling the graphical output without regard to rotational movement or absence of rotational movement are described herein with respect to FIGS. 7A-10D.

In some cases, controlling the graphical output of the display without regard to rotational movement or absence of rotational movement of the rotatable crown includes causing a list of items to scroll across the display in a previously detected direction of rotation of the rotatable crown. For example, if a user is scrolling through a list of items by rotating the crown, and then quickly releases the crown (e.g., "flicking" the crown), the list may continue to scroll despite the crown no longer being rotated (or if the crown is rotated but there is no corresponding detection of a touch event on the crown). In this way, a user can rapidly scroll through a list without having to continue to turn the rotatable crown to cause the list to scroll.

Whether or not a list of items continues to scroll across the display in a previously detected direction may depend, at least in part, on a speed or acceleration of rotation immediately prior to detecting the termination of the contact between the user and the crown. For example, if the user is scrolling below a speed or acceleration threshold, detecting that a user's finger has been removed from the crown may cause the list to cease scrolling entirely. If the user is scrolling above the speed or acceleration threshold, detecting that the user's finger has been removed may cause the list to continue to scroll. This may provide an intuitive user interface technique, as a rapid rate or acceleration of scrolling followed by a removal of a finger (or fingers) may correspond to a user "flicking" the rotatable crown. A user may expect that this type of input will result in the fastest possible scrolling speed, and thus may naturally attempt this input even without a hint or other instruction. On the other hand, when a user is scrolling a list slowly, it may indicate that they are reading or viewing items in the list while the list is moving. Accordingly, the user may naturally expect the list to cease scrolling when they take their finger(s) off of the crown. This process thus produces a natural, intuitive user experience.

The speed or acceleration threshold may be determined by, based on, or otherwise correlate to a readability of the items being scrolled. For example, a speed at which scrolled items can be clearly read may be determined experimentally (or via any other analysis or calculation). The threshold may then be set at or below that speed. Accordingly, when the list items are readable when scrolling, releasing the crown will end the movement of the list, and when the list items are not readable when scrolling, movement of the list will continue after the crown is released.

When the list of items is scrolled after release of the crown, the initial scroll speed of the list may be substantially the same as the speed that was indicated by the rotation of the crown. In some cases, the scroll speed may decrease with time (e.g., decay) after the rotation-tracking window is terminated. For example, after the device detects removal of the user's finger(s), the list of items may continue to scroll, but the scroll speed may decrease for a period of time until the list becomes stationary. The period of time that the list continues to scroll may be any suitable duration. For example, in some cases it may be determined by a timer, so that the list continues to scroll for 1 second, 2 seconds, 3 seconds, 4 seconds, or any other suitable duration. In some cases, the duration may be determined at least in part by a speed of rotation or scrolling immediately prior to the user releasing the crown. For example, a faster scroll or rotation speed may result in a longer scrolling duration after release of the crown, while a slower scroll or rotation speed may result in a shorter scrolling duration after release of the crown.

Once a list of items is scrolling after removal of a user's finger(s), such as while the list of items is scrolling due to a "flick" input on the rotatable crown, the user may wish to terminate the scroll. Accordingly, certain inputs or other events may result in termination of the scroll, such as a user touching the crown with or without rotating the crown. For example, while the list of items is scrolling across the display the electronic device may initiate a subsequent rotation-tracking mode based on a detection of a subsequent contact between the user and the rotatable crown. That is, when the electronic device detects a touch event on the crown while the list of items is scrolling, the device may once again begin using the rotational movement to drive device operations. During the subsequent rotation-tracking mode, the electronic device may determine if a speed of rotation of the rotatable crown is below a threshold value. In accordance with a determination that the speed of rotation of the rotatable crown is below the threshold value, for example if the crown is not being rotated at all or is only being rotated a negligible amount, the electronic device may cease scrolling the list of items across the display. Accordingly, a user can end an automatic or continuing scroll simply by placing a finger on the crown. The list of items may be stopped (e.g., if the crown is touched but not rotated), or it may be scrolled in accordance with a new rotational input (e.g., if the crown is touched and rotated to initiate a new scroll). A graphical example of scrolling a list of items (or any other object or user interface components) in accordance with the foregoing process is described with respect to FIGS. 7A-7D.

The foregoing example relates to scrolling a list of items. The list of items may be lists or groups of icons (e.g., graphics corresponding to applications that are executable on the electronic device), words (e.g., names in a user's contact list, titles of posts in a social network, emails or portions thereof, documents, webpages), images (e.g., photographs, thumbnails), or any other items. However, the same process may apply to other graphical displays or user interface manipulations. For example, rotational movements may be used to zoom in and out of displayed images, interfaces, documents, webpages, or the like. Such zooming interactions may be controlled in the same or similar manner as described above. For example, a "flick" of the rotatable crown may produce a continuing zoom (in or out) of a graphical display, and a subsequent touch on the rotatable crown (with or without rotation) may terminate the zoom.

Another example operation that includes controlling the graphical output of the display without regard to rotational movement or absence of rotational movement of the rotatable crown includes causing the list of items to scroll across the display in a direction opposite to a previously detected direction of rotation of the rotatable crown. This type of operation may be used when a user has scrolled to the end of a list. For example, when a user scrolls to the end of a list of items, the list may be scrolled past a final scroll position (e.g., where the last item in a list is at the bottom of a display). This may be an undesirable graphical state, as the user may lose the context of the list entirely. Accordingly, if a list is scrolled past a final scroll position and then the crown is released, the list may scroll in a direction opposite the prior scroll direction to return to the final scroll position. A graphical example of returning a list to a final scroll position by scrolling a list of items (or any other object or user interface components) in a direction opposite a prior scroll direction is described with respect to FIGS. 8A-8D.

Figure 7A:
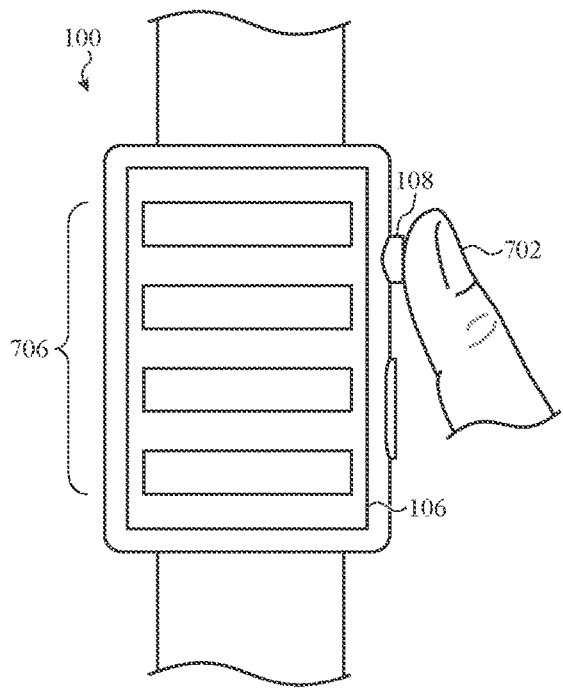
FIGS. 7A-7D depict a user-interface sequence in response to inputs to a contact-sensitive rotatable crown.

FIGS. 7A-7D illustrate an example interaction between the electronic device 100 and a user (e.g., a user's finger 702). In particular, FIGS. 7A-7D show how a user interface may react to a "flick" input on a crown, as described above. As shown in FIG. 7A, the electronic device 100 is displaying a list of items 706 on the display 106. The items in the list may include words, objects, icons, images, or any other suitable displayable item, as described above. Moreover, while the list of items 706 is shown as a group of rectangles, this is merely an example illustration, and the list of items may take any other suitable form or appearance.

Figure 7B:
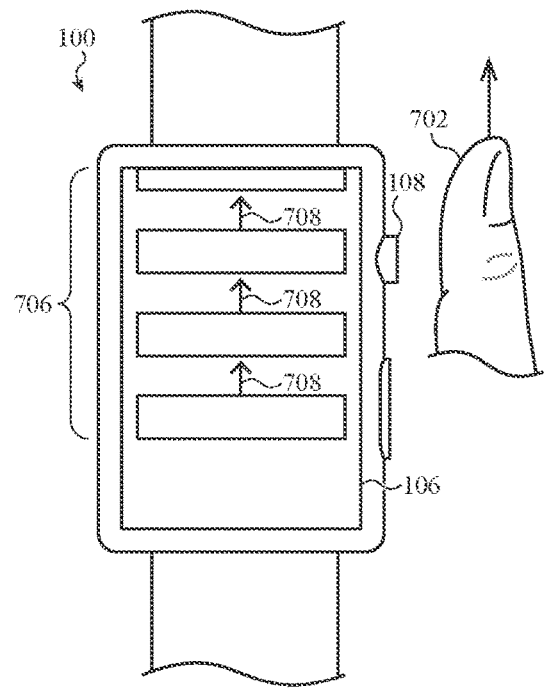

A finger 702 rotates the crown 108 in a direction that causes the list of items 706 to scroll in a first direction, followed by removal of the finger 702 from the crown 108, as illustrated by the sequence from FIG. 7A to FIG. 7B. The rotation of the crown 108 causes the list of items to scroll in a direction, as indicated by arrows 708.

As long as the finger 702 is in contact with the crown 108, the electronic device 100 may be in a rotation-tracking mode in which the list of items 706 is scrolled or not scrolled based on the presence or absence of rotational motion of the crown 108. For example, the rotational motion of the crown 108 that is detected while the finger 702 is in contact with the crown 108 causes the list of items 706 to scroll.

If the speed (or acceleration) of the rotation of the crown 108 satisfies an optional threshold, as described above, the list of items 706 may continue to scroll in the same direction (as indicated by arrows 708) even after the finger 702 has been removed from the crown 108. Once a contact sensor determines that the finger 702 is no longer in contact with the crown 108, the electronic device 100 terminates the rotation-tracking mode and begins to control the graphical output of the display without regard to rotational movement or absence of rotational movement of the crown 108. For example, FIG. 7C shows the list of items 706 continuing to scroll even though the user's finger 702 is no longer contacting the crown 108.

In particular, even though the crown 108 may no longer be rotating (or even if it is rotating due to inertia after removal of the finger 702), the electronic device 100 may control how and whether the list of items 706 scrolls without regard to the rotation or lack of rotation of the crown. In this way, the electronic device 100 uses the additional contact sensitivity of the crown 108 to determine when and whether to use the rotational status of the crown 108 to control or modify the graphical output of the device 100.

Figure 7C:
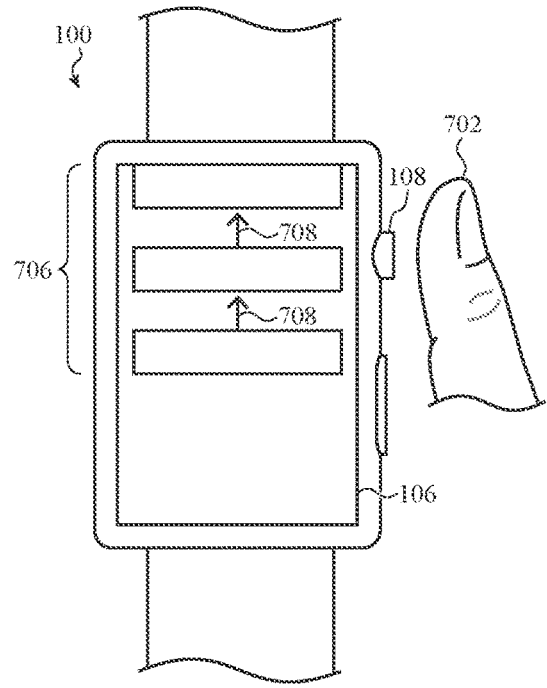
Figure 7D:
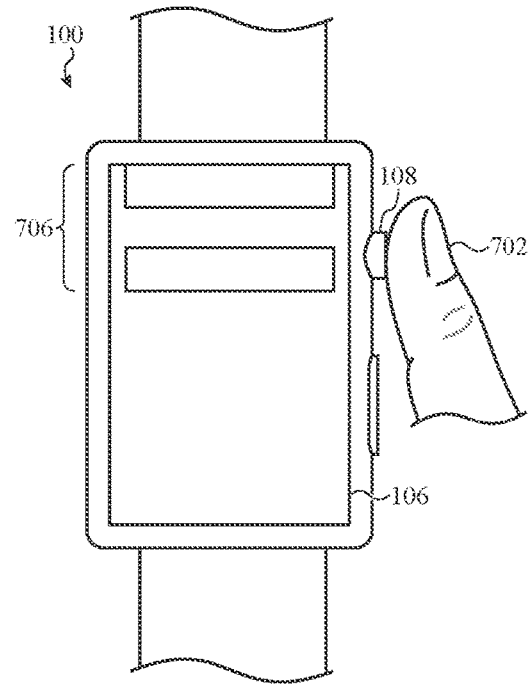

If the user's finger 702 touches the crown 108 while the list of items 706 is still moving, as illustrated in the sequence from FIG. 7C to FIG. 7D, the electronic device 100 may reinitiate the rotation-tracking mode and once again begin scrolling or not scrolling the list of items 706 based the rotation or lack of rotation of the crown 108. In particular, as shown in FIG. 7D, the list of items 706 may cease scrolling when the finger 702 is determined to be in contact with the crown 108 (e.g., when a touch event is detected) without accompanying rotation of the crown 108. Alternatively, as noted above, if the finger 702 touching the crown 108 is accompanied by a rotation of the crown 108, the list of items 706 may scroll across the display according to a speed and/or direction of the accompanying rotation. FIG. 7D shows a static (e.g., not scrolling) list of items 706 after a contact sensor associated with the crown 108 detected a touch event without concurrent rotation or with only incidental or nominal rotation of the crown 108.

Figure 8A:
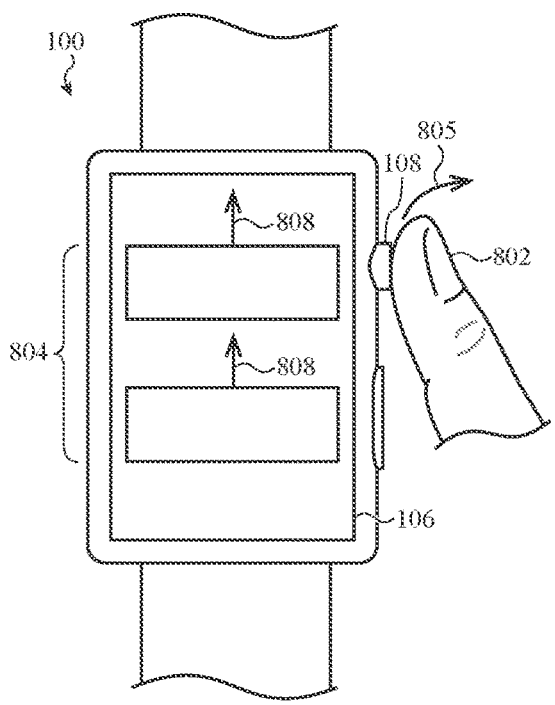
FIGS. 8A-8D depict another user-interface sequence in response to inputs to a contact-sensitive rotatable crown.

FIGS. 8A-8D illustrate another example interaction between the electronic device 100 and a user (e.g., a user's finger 802). In particular, FIGS. 8A-8D show how a user interface may react to a rotational motion that causes a list to scroll past a final scroll position, as described above. As shown in FIG. 8A, the electronic device 100 is displaying a list of items 804 on the display 106. The items in the list may include words, objects, icons, images, or any other suitable displayable item, as described above. Moreover, while the list of items 804 is shown as a group of rectangles, this is merely an example illustration and the list of items may take any other suitable form or appearance.

A finger 802 rotates the crown 108, as indicated by arrow 805, in a direction that causes the list of items 804 to scroll in a first direction, as indicated by arrows 808. In particular, the electronic device 100 may detect that the finger 802 has contacted the crown 108, and in response initiate a rotation-tracking mode. While the rotation-tracking mode is active, the list of items 804 may be moved in accordance with rotational movement, or absence of rotational movement, of the crown 108. For example, if the crown 108 is rotated, the list of items 804 will move in a speed and/or direction corresponding to the rotational movement. Similarly, if the crown 108 is stationary (e.g., because the user is touching but not rotating the crown 108), the list of items 804 may remain in a static position.

Figure 8B:
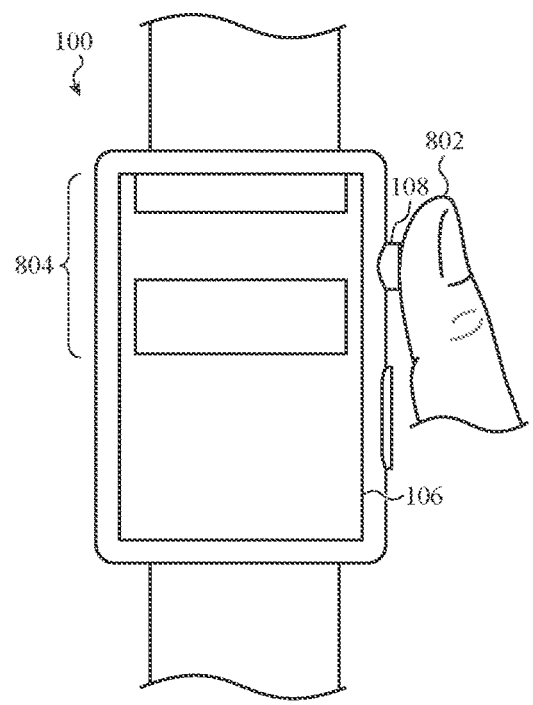

As shown in FIG. 8B, the finger 802 may cease rotating the crown 108 after the list of items 804 has scrolled past a final scroll position, resulting in the list of items 804 ceasing to scroll. As noted above, a final scroll position for a list of items 804 may be a position where a last item in the list of items 804 is positioned at or near a bottom of the display 106. For example, FIGS. 8A and 8D may illustrate the list of items 804 in a final scroll position. In some cases, once the list of items 804 reaches a maximum scroll position, the list of items 804 ceases to scroll despite further rotational movement of the crown. A maximum scroll position may correspond to a position where only one list item is showing on the display 106, or where a predetermined blank space is shown below the last list item.

The list of items 804 may remain in the scrolled position shown in FIG. 8B (which is past a final scroll position and may or may not be at a maximum scroll position) as long as the finger 802 remains in contact with the crown 108, as detected by a contact sensor associated with the crown 108. This operation is consistent with the electronic device 100 operating in a rotation-tracking mode and thus controlling the graphical output of the display 106 in accordance with rotational movement or absence of rotational movement of the rotatable crown. More particularly, the electronic device 100 is detecting an absence of rotational movement while also detecting contact between the user's finger 802 and the crown 108, and thus is controlling the graphical output of the display 106 by not moving the list of items 804. If no contact sensing capability were provided, the electronic device 100 may be unable to determine whether the lack of rotational movement of the rotatable crown is due to the user continuing to hold the crown in a particular position, or due to the user having removed their finger from the crown. Accordingly, by incorporating contact sensing into the crown 108, such ambiguity can be eliminated or reduced and a more natural user experience may be provided.

Figure 8C:
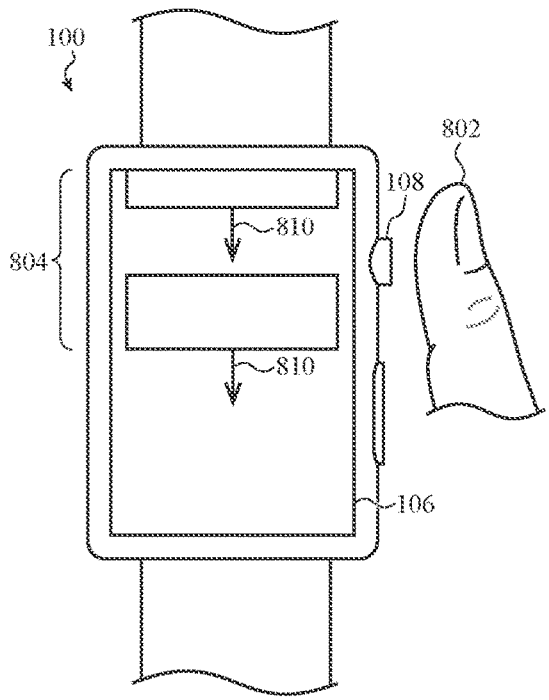
Figure 8D:
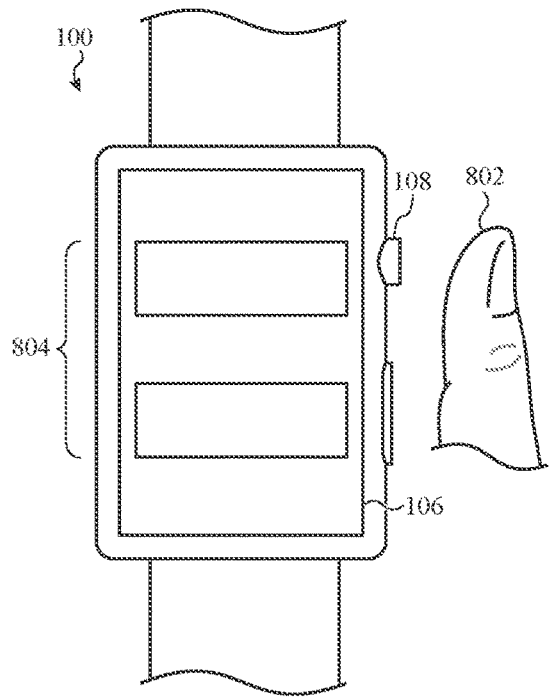

FIG. 8C shows how the graphical output may be controlled once the user's finger 802 is removed from the crown 108. In particular, once the user's finger 802 is removed from the crown 108, the rotation-tracking mode may be terminated, and the graphical output of the display 106 may be controlled without regard to rotational movement or absence of rotational movement. In the illustrated example, the list of items 804 that was previously being held in a position away from a final scroll position (e.g., a maximum scroll position) due to the continued presence of the finger 802 on the crown 108, may move to the final scroll position once the finger 802 is removed, as shown in FIG. 8D. Thus, because the rotation-tracking mode has been terminated the list of items 804 is moved despite there being no corresponding rotation of the crown 108.

Moving to the final scroll position may include scrolling the list of items 804 in a direction that is opposite the previous direction of movement. For example, as shown in FIGS. 8A-8B, the list of items 804 may be scrolled in a first direction in response to rotational movement of the crown 108, as indicated by arrows 808. When the user's finger 802 is released, the list of items 804 may be scrolled in a second direction opposite the first direction, as indicated by arrows 810 (FIG. 8C).

FIGS. 8A-8D show how a list of items may be moved away from and subsequently return to a final scroll position based on a rotation of and subsequent release of the rotatable crown. Final positions or arrangements of displayed objects other than that illustrated in FIGS. 8A-8D are also possible. For example, a final scroll position of a list of items may correspond to any arrangement of objects that visually indicates or suggests an end of the list of items, and may be a position from which further scrolling may be limited in one or more directions. Moreover, while a final scroll position is shown at a bottom or end of a list of items, there may also be a final scroll position at the top or beginning of the list. Similar graphical operations may apply at any final scroll position.

FIGS. 7A-8D show example graphical outputs relating to lists of items. The techniques described herein, and in particular using a contact sensor to enable a rotation-tracking mode, may also be used for other types of graphical outputs. FIGS. 9A-10D show example interactions in which an image zoom or magnification level is controlled by a rotatable crown associated with a contact sensor.

Figure 9A:
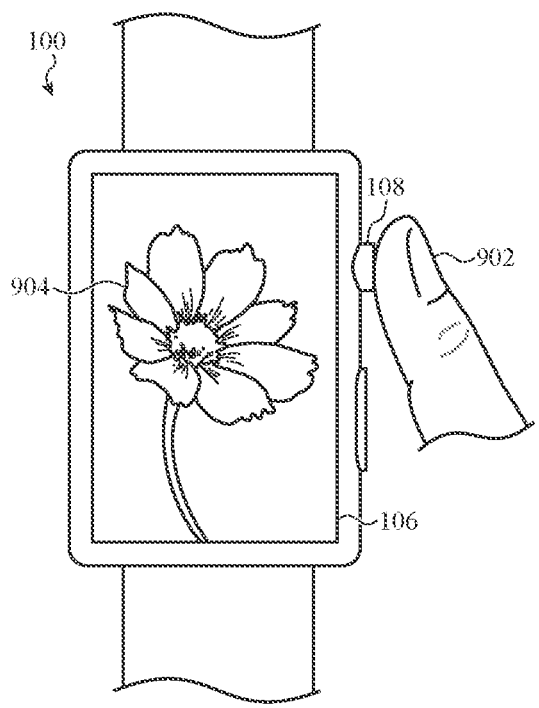
FIGS. 9A-9D depict yet another user-interface sequence in response to inputs to a contact-sensitive rotatable crown.
Figure 9B:
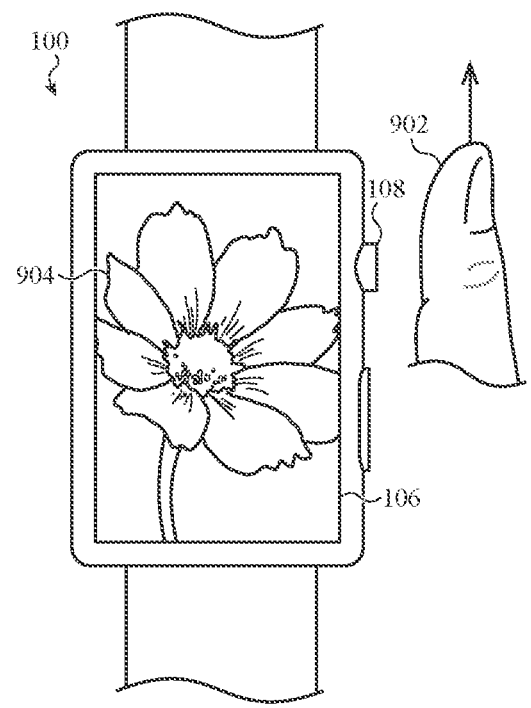

As shown in the sequence from FIG. 9A to FIG. 9B, a finger 902 rotates the crown 108 in a direction that causes an image 904 to zoom in a first direction (e.g., magnifying the image or "zooming in"), followed by removal of the finger 902 from the crown 108. Similar to the operations described above with respect to FIGS. 7A-7B, as long as the finger 902 is in contact with the crown 108, the electronic device 100 may be in a rotation-tracking mode in which the image 904 is magnified or not magnified based on the presence or absence of rotational motion of the crown 108.

If the speed of the rotation of the crown 108 satisfies an optional threshold, the image 904 may continue to zoom in the same direction even after the finger 902 has been removed from the crown 108. Once a contact sensor determines that the finger 902 is no longer in contact with the crown 108, and optionally after the speed satisfies the threshold, the electronic device 100 terminates the rotation-tracking mode and begins to control the graphical output of the display without regard to rotational movement or absence of rotational movement of the crown 108. For example, FIG. 9C shows the image 904 continuing to be expanded even though the user's finger 902 is no longer contacting the crown 108.

Figure 9C:
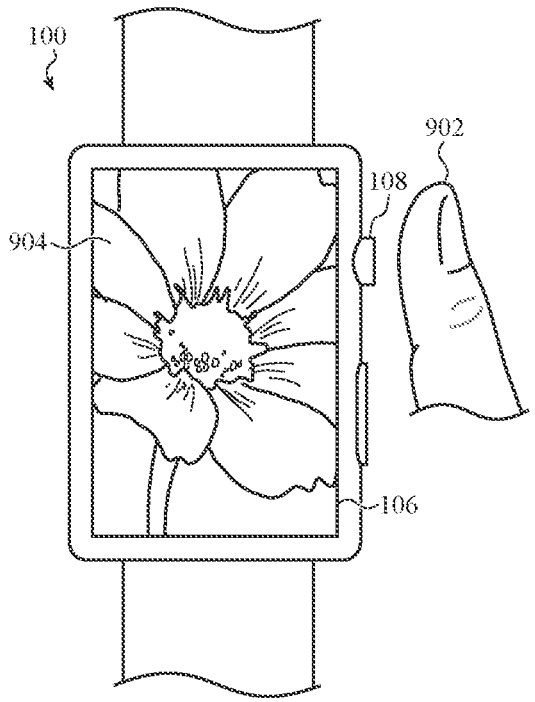
Figure 9D:
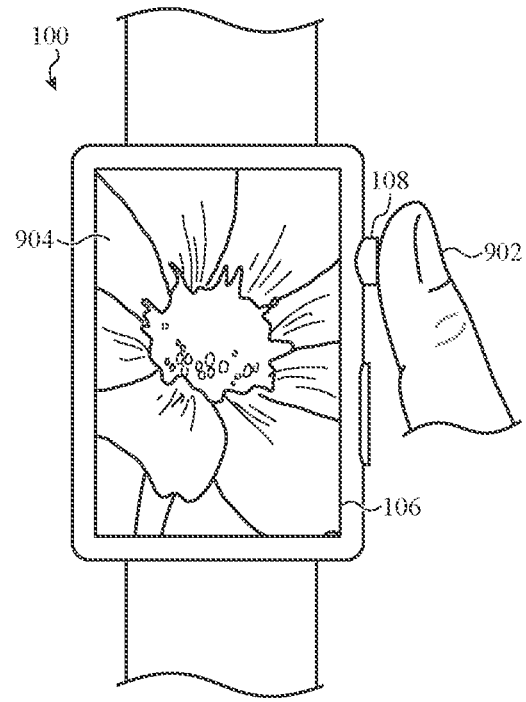

If the user's finger 902 touches the crown 108 while the image 904 is still expanding, as illustrated in the sequence from FIG. 9C to FIG. 9D, the electronic device 100 may reinitiate the rotation-tracking mode and once again begin magnifying or not magnifying the image 904 based the rotation or lack of rotation of the crown 108. In particular, as shown in FIG. 9D, the image 904 may cease zooming when the finger 902 is determined to be in contact with the crown 108 (e.g., when a touch event is detected) without accompanying rotation of the crown 108.

FIGS. 10A-10D illustrate another example interaction between the electronic device 100 and a user (e.g., a user's finger 1002). In particular, FIGS. 10A-10D show how a user interface may react to a rotational motion that causes an image to be magnified or expanded past a maximum magnification.

Figure 10A:
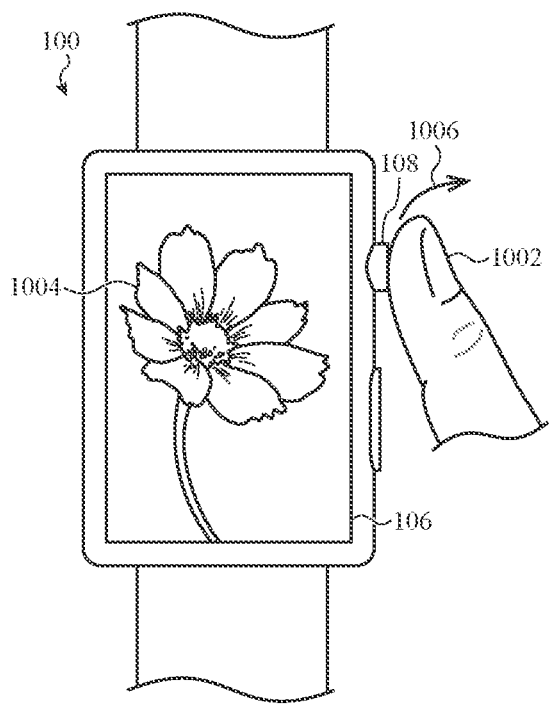
FIGS. 10A-10D depict yet another user-interface sequence in response to inputs to a contact-sensitive rotatable crown.

As shown in FIG. 10A, the electronic device 100 is displaying an image 1004 on the display 106. A finger 1002 rotates the crown 108, as indicated by arrow 1006, in a direction that causes the image 1004 to be magnified. In particular, the electronic device 100 may detect that the finger 1002 has contacted the crown 108 and initiate a rotation-tracking mode. While the rotation-tracking mode is active, the image 1004 may be magnified or reduced in accordance with rotational movement, or absence of rotational movement, of the crown 108.

Figure 10B:
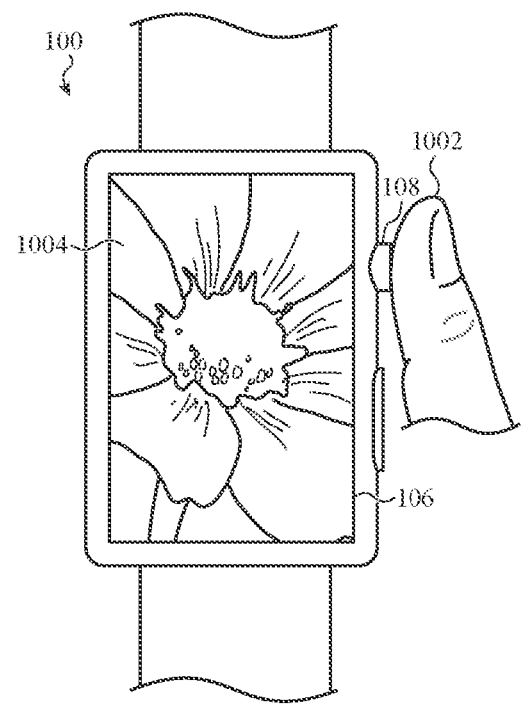

As shown in FIG. 10B, the finger 1002 may cease rotating the crown 108 after the image 1004 has been magnified past a final magnification, resulting in the image 1004 ceasing to be further magnified. The final magnification may be determined in any suitable way and based on any available data or information, including an image size, an image resolution, a display size, a user-selected value, an image content, an image file or data type, or the like. As one example, the final magnification may correspond to a multiple of the display size, such as when the whole of the magnified image would be 500% of the size of the display 106 (or any other suitable magnification value).

In some cases, once the image 1004 reaches a maximum magnification, the image 1004 ceases to be magnified despite further rotational movement of the crown. A maximum magnification may correspond to a greater magnification value than the final magnification (e.g., 600% of the size of the display), and may be used only as a temporary magnification amount when a user attempts to zoom past the final magnification value.

The image 1004 may remain magnified, as shown in FIG. 10B, as long as the finger 802 remains in contact with the crown 108, as detected by a contact sensor associated with the crown 108. This magnification may be past a final magnification and may or may not be at a maximum magnification. This operation is consistent with the electronic device 100 operating in a rotation-tracking mode and thus controlling the graphical output of the display 106 in accordance with rotational movement or absence of rotational movement of the crown 108. More particularly, the electronic device 100 is detecting an absence of rotational movement while also detecting contact between the user's finger 1002 and the crown 108, and thus is controlling the graphical output of the display 106 by not further magnifying the image 1004.

Figure 10C:
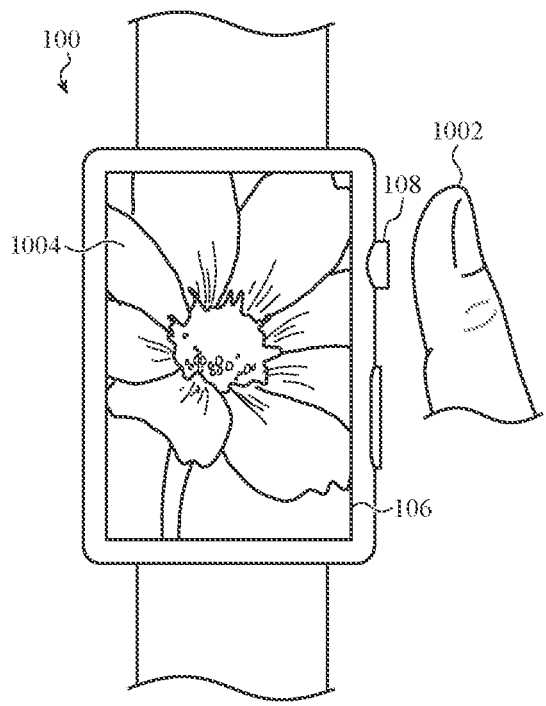
Figure 10D:
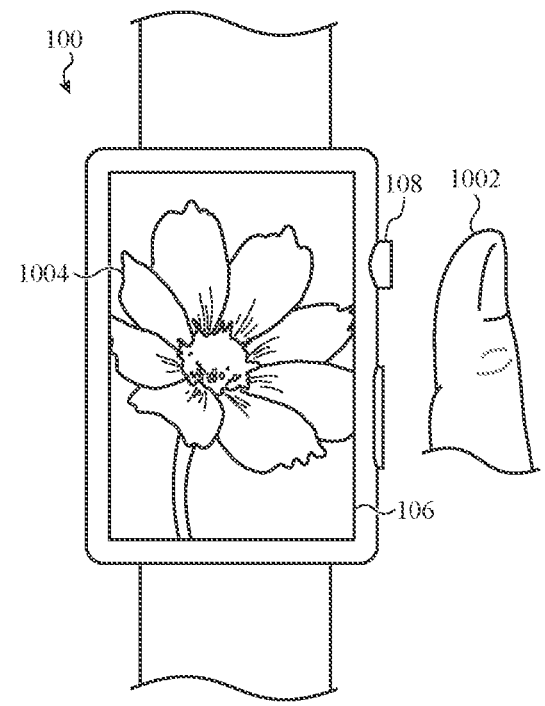

FIG. 10C shows how the graphical output may be controlled once the user's finger 1002 is removed from the crown 108. In particular, once the user's finger 1002 is removed from the crown 108, the rotation-tracking mode may be terminated, and the graphical output of the display 106 may be controlled without regard to rotational movement or absence of rotational movement. In the illustrated example, the image 1004 that was previously being magnified beyond a final magnification (and optionally at a maximum magnification) due to the continued presence of the finger 1002 on the crown 108, may move to the final magnification once the finger 1002 is removed, as shown in FIG. 10D. Thus, because the rotation-tracking mode has been terminated, the image 1004 is reduced (e.g., "zoomed out") despite there being no corresponding rotation of the crown 108.

Figure 11A:
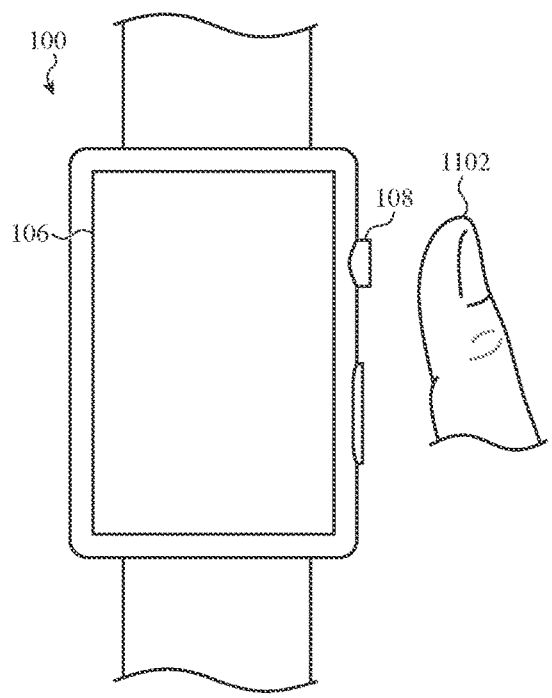
FIGS. 11A-11D depict yet another user-interface sequence in response to inputs to a contact-sensitive rotatable crown.
Figure 11B:
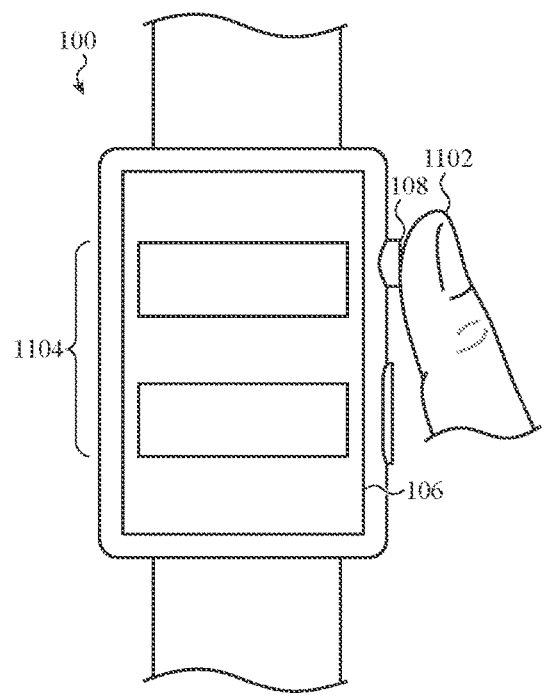
Figure 11C:
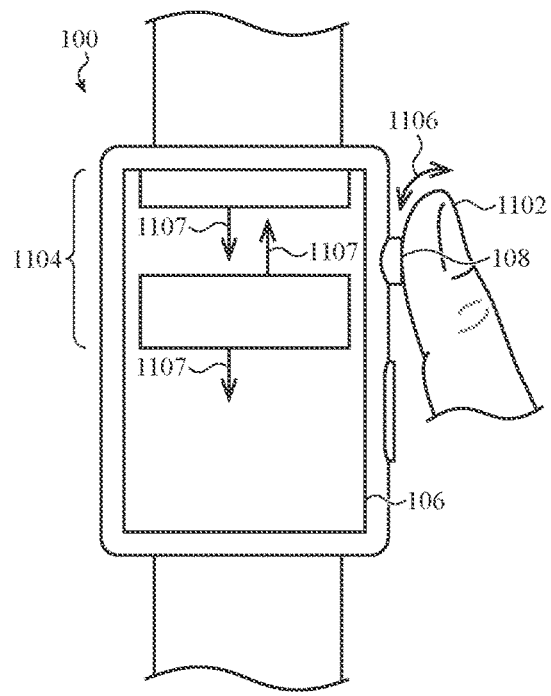

FIGS. 11A-11D illustrate yet another example interaction between the electronic device 100 and a user (e.g., a user's finger 1102). In particular, FIGS. 11A-11D show how a display may be activated in response to a touch input on a crown. FIG. 11A shows the electronic device 100 with nothing on its display 106. The device 100 may be in a sleep mode, a low-power mode, or any other mode in which no graphical output is being displayed on the display 106.

When the electronic device 100 detects contact between a user (e.g., the finger 1102) and the crown 108, a graphical output may be displayed on the display 106. Notably, the contact need not be accompanied by any rotational or translational movement of the crown 108. As shown, the graphical output includes a list of items 1104, though any other graphical output may be displayed, including a list or arrangement of icons corresponding to applications or programs, a watch face, a map, or any other suitable graphical output.

Once the contact is detected and the graphical output is displayed on the display 106, the user may manipulate the crown 108 to interact with the user interface. For example, the user may rotate the crown 108, as indicated by arrow 1106, to cause the list of items 1104 to be scrolled in one or more directions, as indicated by arrows 1107.

Figure 11D:
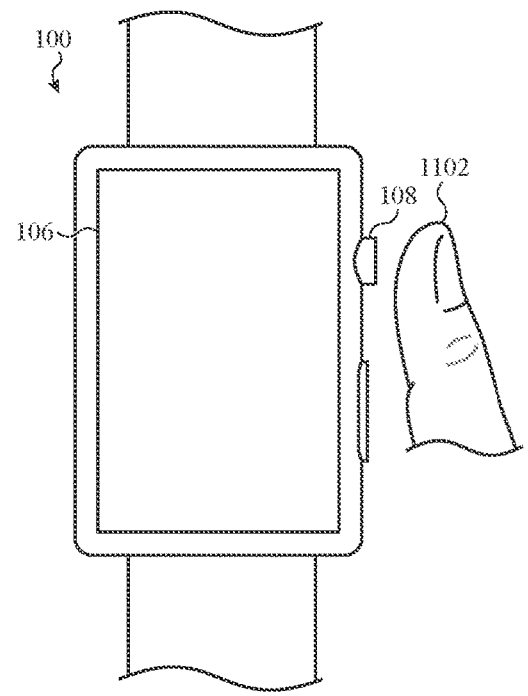

When the electronic device 100 detects that the finger 1102 is no longer in contact with the crown 108 (e.g., using the contact sensor), the graphical output may be terminated, as shown in FIG. 11D. In some cases, the electronic device 100 may be placed in a sleep mode, a low-power mode, or any other mode in which no graphical output is displayed.

While several foregoing examples, methods, and techniques are described relative to a rotatable crown, the same or similar examples, methods, and techniques also apply to non-rotating crowns (e.g., the crown 508, FIG. 5). In such cases, instead of physical rotational movement of the crown, analogous inputs may be detected by a touch sensor associated with the crown.

Figure 12:
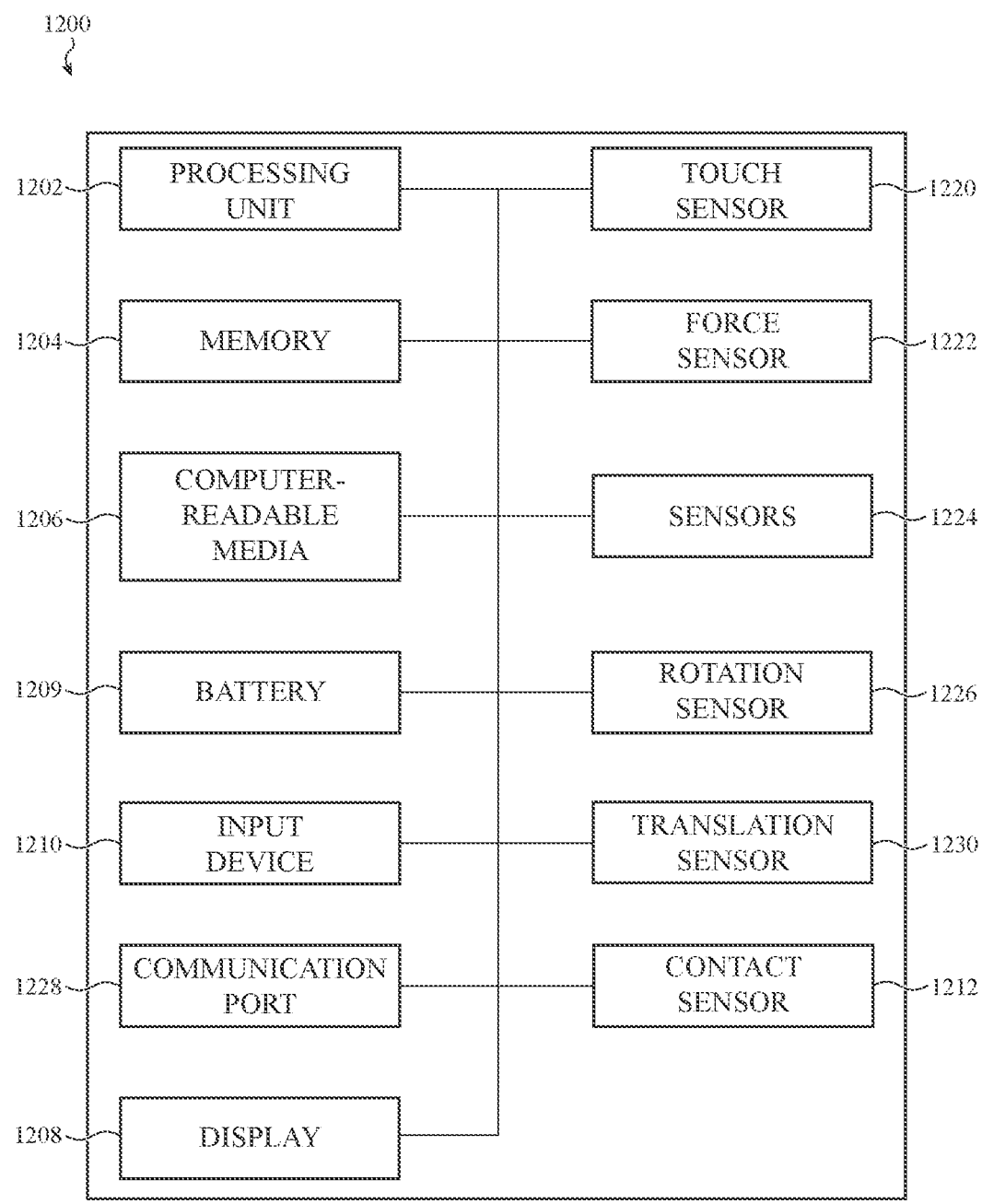
FIG. 12 depicts example components of an electronic device.

FIG. 12 depicts example components of an electronic device in accordance with the embodiments described herein, such as the electronic device 100. As shown in FIG. 12, a device 1200 includes a processing unit 1202 operatively connected to computer memory 1204 and/or computer-readable media 1206. The processing unit 1202 may be operatively connected to the memory 1204 and computer-readable media 1206 components via an electronic bus or bridge. The processing unit 1202 may include one or more computer processors or microcontrollers that are configured to perform operations in response to computer-readable instructions. The processing unit 1202 may include the central processing unit (CPU) of the device. Additionally or alternatively, the processing unit 1202 may include other processors within the device including application specific integrated chips (ASIC) and other microcontroller devices.

The memory 1204 may include a variety of types of non-transitory computer-readable storage media, including, for example, read access memory (RAM), read-only memory (ROM), erasable programmable memory (e.g., EPROM and EEPROM), or flash memory. The memory 1204 is configured to store computer-readable instructions, sensor values, and other persistent software elements. Computer-readable media 1206 also includes a variety of types of non-transitory computer-readable storage media including, for example, a hard-drive storage device, a solid-state storage device, a portable magnetic storage device, or other similar device. The computer-readable media 1206 may also be configured to store computer-readable instructions, sensor values, and other persistent software elements.

In this example, the processing unit 1202 is operable to read computer-readable instructions stored on the memory 1204 and/or computer-readable media 1206. The computer-readable instructions may adapt the processing unit 1202 to perform the operations or functions described above with respect to FIGS. 1-11D. In particular, the processing unit 1202, the memory 1204, and/or the computer-readable media 1206 may be configured to cooperate with the touch sensor 1220, rotation sensor 1226, and/or rotation sensor 1230 to determine when to initiate or terminate a rotation-tracking mode, and how to control a graphical output of the device 1200 (e.g., via the display 1208) based on interactions with a rotatable crown (e.g., the crown 108). The computer-readable instructions may be provided as a computer-program product, software application, or the like.

As shown in FIG. 12, the device 1200 also includes a display 1208. The display 1208 may include a liquid-crystal display (LCD), organic light emitting diode (OLED) display, LED display, or the like. If the display 1208 is an LCD, the display 1208 may also include a backlight component that can be controlled to provide variable levels of display brightness. If the display 1208 is an OLED or LED type display, the brightness of the display 1208 may be controlled by modifying the electrical signals that are provided to display elements. The display 1208 may correspond to any of the displays shown or described herein.

The device 1200 may also include a battery 1209 that is configured to provide electrical power to the components of the device 1200. The battery 1209 may include one or more power storage cells that are linked together to provide an internal supply of electrical power. The battery 1209 may be operatively coupled to power management circuitry that is configured to provide appropriate voltage and power levels for individual components or groups of components within the device 1200. The battery 1209, via power management circuitry, may be configured to receive power from an external source, such as an AC power outlet. The battery 1209 may store received power so that the device 1200 may operate without connection to an external power source for an extended period of time, which may range from several hours to several days.

In some embodiments, the device 1200 includes one or more input devices 1210. An input device 1210 is a device that is configured to receive user input. The one or more input devices 1210 may include, for example, a push button, a touch-activated button, a keyboard, a key pad, or the like (including any combination of these or other components). In some embodiments, the input device 1210 may provide a dedicated or primary function, including, for example, a power button, volume buttons, home buttons, scroll wheels, and camera buttons. Generally, a touch sensor or a force sensor may also be classified as an input device. However, for purposes of this illustrative example, the touch sensor 1220 and a force sensor 1222 are depicted as distinct components within the device 1200.

The device 1200 may also include a touch sensor 1220 that is configured to determine a location of a touch over a touch-sensitive surface of the device 1200. The touch sensor 1220 associated with a touch-sensitive surface of the device 1200 may include a capacitive array of electrodes or nodes that operate in accordance with a mutual-capacitance or self-capacitance scheme. As described herein, the touch sensor 1220 may be integrated with one or more layers of a display stack to provide the touch-sensing functionality of a touchscreen.

The device 1200 may also include a contact sensor 1212 (e.g., the contact sensors 302, 409, 509) that is configured to detect contact between a user and a crown or other component or portion of a device (such as the crown 108). The contact sensor 1212 associated with a crown may include a capacitive sensor that operates in accordance with a mutual-capacitance or self-capacitance scheme. Other types of contact sensors may also be used, including inductive sensors, resistive sensors, magnetic sensors, continuity sensors, or the like.

The device 1200 may also include a force sensor 1222 that is configured to receive and/or detect force inputs applied to a user input surface of the device 1200 (e.g., the display 106). The force sensor 1222 may include or be coupled to capacitive sensing elements that facilitate the detection of changes in relative positions of the components of the force sensor (e.g., deflections caused by a force input).

The device 1200 may also include one or more sensors 1224 that may be used to detect an environmental condition, orientation, position, or some other aspect of the device 1200. Example sensors 1224 that may be included in the device 1200 include, without limitation, one or more accelerometers, gyrometers, inclinometers, goniometers, or magnetometers. The sensors 1224 may also include one or more proximity sensors, including a magnetic hall-effect sensor, inductive sensor, capacitive sensor, continuity sensor, and the like.

The sensors 1224 may also be broadly defined to include wireless positioning devices including, without limitation, global positioning system (GPS) circuitry, Wi-Fi circuitry, cellular communication circuitry, and the like. The device 1200 may also include one or more optical sensors including, without limitation, photodetectors, photosensors, image sensors, infrared sensors, and the like.

The device 1200 may also include a communication port 1228 that is configured to transmit and/or receive signals or electrical communication from an external or separate device. The communication port 1228 may be configured to couple to an external device via a cable, adaptor, or other type of electrical connector. In some embodiments, the communication port 1228 may be used to couple the device 1200 to an accessory, including a dock or case, a stylus or other input device, smart cover, smart stand, keyboard, or other device configured to send and/or receive electrical signals.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A wearable electronic device, comprising:
a housing;
a band attached to the housing and configured to attach the wearable electronic device to a user;
a display positioned within the housing and defining a front face of the wearable electronic device;
a crown positioned along a side of the housing;
a rotation sensor configured to detect a rotational movement of the crown;
a contact sensor configured to detect contact between the user and the crown; and
a processor operatively coupled to the contact sensor and the display and configured to:
while a first contact is detected between the user and the crown:
modify a graphical output of the display in accordance with the rotational movement of the crown; and
determine a speed of the rotational movement of the crown;
in response to detecting a release of the first contact between the user and the crown, determine whether the speed of the rotational movement of the crown is at or above a predetermined threshold;
when the speed of the rotational movement of the crown is above the predetermined threshold, modify the graphical output of the display without regard to rotational movement or absence of rotational movement of the crown; and
when the speed of the rotational movement of the crown is below the predetermined threshold, cease to modify the graphical output of the display.

2. The wearable electronic device of claim 1, wherein:
modifying the graphical output of the display in accordance with rotational movement of the crown comprises causing a list of items to scroll across the display in a scroll direction in accordance with a direction of rotation of the crown;

modifying the graphical output of the display without regard to rotational movement or absence of rotational movement of the crown comprises continuing to scroll the list of items across the display; and ceasing to modify the graphical output of the display comprises ceasing the scrolling of the list of items.

3. The wearable electronic device of claim 1, wherein:

modifying the graphical output of the display in accordance with rotational movement of the crown comprises causing a portion of a list of items to scroll off of the display in a first direction; and modifying the graphical output of the display without regard to rotational movement or absence of rotational movement of the crown comprises causing the portion of the list of items to scroll onto the display in a second direction opposite the first direction.

4. The wearable electronic device of claim 1, wherein: the crown comprises:

a knob having a conductive portion; and a stem conductively coupled to the conductive portion of the knob and extending into the housing; and the contact sensor comprises a capacitive sensor conductively coupled to the stem.

5. The wearable electronic device of claim 4, wherein the stem is electrically isolated from the housing.

6. The wearable electronic device of claim 5, wherein the knob and the stem are a monolithic structure.

7. The wearable electronic device of claim 5, wherein the capacitive sensor is conductively coupled to the stem via a rotary electrical contact.

8. A method of operating a wearable electronic device having a display and a rotatable crown, comprising:

detecting a first rotational movement of the rotatable crown;

determining whether a user is contacting the rotatable crown during the first rotational movement;

in response to determining that the user is contacting the rotatable crown during the first rotational movement, modifying a graphical output of the display in accordance with a rotational movement of the rotatable crown;

detecting a second rotational movement of the rotatable crown;

determining a speed of the second rotational movement;

detecting a release of a contact with the rotatable crown during the second rotational movement;

when the speed of the second rotational movement is above a predetermined threshold, modify the graphical output of the display without regard to rotational movement or absence of rotational movement of the crown; and when the speed of the second rotational is below the predetermined threshold, cease to modify the graphical output of the display.

9. The method of claim 8, wherein:

modifying the graphical output of the display in accordance with the first rotational movement of the rotatable crown comprises moving an element displayed on the display in a first direction based at least partially on a rotational direction of the first rotational movement of the rotatable crown; and not modifying the graphical output of the display despite detecting the second rotational movement comprises maintaining the element stationary on the display.

10. The method of claim 8, wherein:

modifying the graphical output of the display in accordance with the first rotational movement of the rotatable crown comprises moving an element displayed on the display in a first direction and at a speed based at least partially on the first rotational movement of the rotatable crown; and modifying the graphical output of the display despite absence of the second rotational movement of the rotatable crown comprises moving the element in the first direction despite detecting no rotational movement of the rotatable crown.

11. The method of claim 10, wherein modifying the graphical output of the display despite absence of the second rotational movement of the rotatable crown further comprises moving the graphical output of the display at a speed that decreases over time.

12. A method of operating a wearable electronic device having a display and a rotatable crown, comprising:

detecting a contact between a user and the rotatable crown;

enabling a rotation-tracking mode based on detecting the contact; and while the rotation-tracking mode is enabled:

detecting a rotational movement of the rotatable crown;

determining a speed of the rotational movement of the rotatable crown;

detecting a termination of the contact between the user and the rotatable crown;

in response to detecting the termination of the contact and when the speed of the rotational movement is above a predetermined threshold, move an element on the display without regard to the rotational movement or absence of the rotational movement of the crown; and in response to detecting the termination of the contact and when the speed of the rotational movement of the crown is below the predetermined threshold, cease movement of the element on the display.

13. The method of claim 12, wherein detecting the contact between the user and the rotatable crown comprises detecting an electrical characteristic of the rotatable crown that is indicative of contact between the user and the rotatable crown.

14. The method of claim 12, wherein:

the element displayed on the display is an item of a list; and moving the element comprises causing the list of items to scroll across the display in a scroll direction based on a rotation direction of the rotatable crown.

* * * * *